(12) United States Patent
Weedon et al.

(10) Patent No.: US 12,017,914 B2
(45) Date of Patent: Jun. 25, 2024

(54) STEAM OR DRY REFORMING OF HYDROCARBONS

(71) Applicant: Biohydrogen Technologies Ltd., Rotherfield (GB)

(72) Inventors: Geoffrey Gerald Weedon, Maraval (TT); Jack Gerald Weedon, Maraval (TT)

(73) Assignee: Biohydrogen Technologies Ltd.

( * ) Notice: Subject to any disclaimer, the term of this patent is extended or adjusted under 35 U.S.C. 154(b) by 706 days.

(21) Appl. No.: 17/268,388

(22) PCT Filed: Aug. 19, 2019

(86) PCT No.: PCT/GB2019/052316
§ 371 (c)(1),
(2) Date: Feb. 12, 2021

(87) PCT Pub. No.: WO2020/035706
PCT Pub. Date: Feb. 20, 2020

(65) Prior Publication Data
US 2021/0316988 A1    Oct. 14, 2021

(30) Foreign Application Priority Data

Aug. 17, 2018  (GB) ..................................... 1813431
Sep. 6, 2018   (GB) ..................................... 1814517
Feb. 6, 2019   (GB) ..................................... 1901660

(51) Int. Cl.
*C01B 3/38*     (2006.01)
*B01J 8/04*     (2006.01)
*B01J 8/06*     (2006.01)

(52) U.S. Cl.
CPC ............. *C01B 3/382* (2013.01); *B01J 8/0457* (2013.01); *B01J 8/0465* (2013.01); *B01J 8/0469* (2013.01);
(Continued)

(58) Field of Classification Search
CPC . C01B 3/382; C01B 3/384; C01B 2203/0233; C01B 2203/0244;
(Continued)

(56) References Cited

U.S. PATENT DOCUMENTS 4,224,298 A  *  9/1980  Robinson ................. B01J 8/062
                                                       252/373
4,650,651 A     3/1987  Fuderer
(Continued)

FOREIGN PATENT DOCUMENTS

CN          1832900 A       9/2006
CN          1514803 A       8/2008
(Continued)

OTHER PUBLICATIONS

Machine Translation of DE-102016221602-A1 (Nov. 13, 2023) (Year: 2023).*
(Continued)

*Primary Examiner* — Matthew J Merkling
(74) *Attorney, Agent, or Firm* — Osha Bergman Watanabe & Burton LLP

(57) ABSTRACT

A process for steam or dry reforming of hydrocarbons in a reforming reactor, comprising the steps of: (a) passing a feedstock, comprising one or more hydrocarbons together with steam and/or $CO_2$, through a first catalytic zone at an elevated temperature, to form a partly reformed process gas, wherein the first catalytic zone comprises one or more elongate conduits, each containing reforming catalyst; and (b) passing the partly reformed process gas through a second catalytic zone at an elevated temperature, so as to form a reformed gas stream, wherein the second catalytic zone comprises one or more elongate conduits, each containing reforming catalyst; wherein the process further comprises the combustion of a fluid fuel with a combustion-sustaining
(Continued)

medium in an exothermic combustion region, to form a hot combustion products stream, wherein the exothermic combustion region is adjacent to and laterally surrounds each of the second catalytic zone elongate conduits.

25 Claims, 8 Drawing Sheets

(52) U.S. Cl.
CPC ............ *B01J 8/048* (2013.01); *B01J 8/0496* (2013.01); *B01J 8/062* (2013.01); *C01B 3/384* (2013.01); *B01J 2208/00212* (2013.01); *B01J 2208/00309* (2013.01); *B01J 2208/00495* (2013.01); *B01J 2208/00504* (2013.01); *B01J 2208/00849* (2013.01); *C01B 2203/0233* (2013.01); *C01B 2203/0244* (2013.01); *C01B 2203/0811* (2013.01); *C01B 2203/0883* (2013.01); *C01B 2203/142* (2013.01); *C01B 2203/82* (2013.01)

(58) Field of Classification Search
CPC ..... C01B 2203/0811; C01B 2203/0883; C01B 2203/142; C01B 2203/82; B01J 8/0457; B01J 8/0465; B01J 8/0469; B01J 8/048; B01J 8/0496; B01J 8/062; B01J 2208/00212; B01J 2208/00309; B01J 2208/00495; B01J 2208/00504; B01J 2208/00849
See application file for complete search history.

(56) References Cited

U.S. PATENT DOCUMENTS

| | | | | |
|---|---|---|---|---|
| 4,690,690 A * | 9/1987 | Andrew | ............... | C01B 3/382 252/373 |
| 5,226,928 A * | 7/1993 | Makabe | ............... | C01B 3/384 422/204 |
| 6,296,814 B1 * | 10/2001 | Bonk | ............... | B01J 8/008 422/651 |
| 6,645,443 B1 | 11/2003 | Vogel et al. | | |
| 10,246,326 B2 * | 4/2019 | Chlapik | ............... | B01J 8/062 |
| 2001/0029735 A1 * | 10/2001 | Miura | ............... | B01B 1/005 60/512 |
| 2006/0277828 A1 * | 12/2006 | Licht | ............... | B01J 8/062 48/198.1 |
| 2008/0131361 A1 * | 6/2008 | Garg | ............... | B01J 23/58 422/600 |
| 2009/0104486 A1 * | 4/2009 | Kanao | ............... | B01J 19/249 429/424 |
| 2009/0274593 A1 | 11/2009 | Fischer et al. | | |
| 2010/0189638 A1 * | 7/2010 | Giroudiere | ............... | B01J 8/062 422/201 |
| 2010/0254865 A1 * | 10/2010 | Choi | ............... | C01B 3/384 422/211 |
| 2011/0168605 A1 * | 7/2011 | Blevins | ............... | C10J 3/487 422/187 |

FOREIGN PATENT DOCUMENTS

| | | | |
|---|---|---|---|
| DE | 10209886 A1 | 9/2003 | |
| DE | 102016221602 A1 * | 5/2018 | ............... B01J 8/06 |
| DK | 126685 A | 3/1985 | |
| EP | 0195688 A2 | 9/1986 | |
| EP | 0437059 A2 | 7/1991 | |
| EP | 1342694 A1 | 9/2003 | |
| EP | 1403215 A1 | 3/2004 | |
| EP | 2520542 A | 11/2012 | |
| GB | 2359764 A | 9/2001 | |
| JP | 4049445 B | 2/2008 | |
| WO | 2001055027 A1 | 8/2001 | |

OTHER PUBLICATIONS

Patent Seekers, Ltd., Patentability Search Report, Case 15411, dated Sep. 13, 2018, Innovation House, Newport, GB.
Frost, Jamie, Corrected Search Report under Section 17, dated Apr. 2, 2019, UKIPO, Newport, GB.
Lackova, Mirian, ISR & WO, Oct. 10, 2019, European Patent Office, Rijswijk, NL.
Johnson, Yvonne, Amended Demand, Jun. 19, 2020, Barker Brettell LLP, Birmingham, GB.
Cristescu, Ioana, IPER, European Patent Office, Oct. 30, 2020, Newport, GB.

* cited by examiner (109)

(101)

STEAM OR DRY REFORMING OF HYDROCARBONS

The present invention relates to a process for the steam or dry reforming of hydrocarbons, and to apparatus for the steam or dry reforming of hydrocarbons.

BACKGROUND TO THE INVENTION

Steam reforming of hydrocarbons, such as methane is well known. Dry reforming of hydrocarbons is also known, whereby $CO_2$ is used to replace all or part of the steam. Although steam reforming is currently more widely used, the present invention is equally applicable to dry reforming. Therefore both processes are contemplated and discussed.

The endothermic reactions occurring in a process for steam hydrocarbon reforming can be described by the following reaction schemes:

$$CH_4 + H_2O = CO + 3H_2 (-\Delta H°298 = -206 \text{ KJ})$$

$$CH_4 + 2H_2O = CO_2 + 4H_2 (-\Delta H°298 = -165 \text{ KJ})$$

Corresponding reaction schemes can be established for steam reforming of hydrocarbons higher than methane, and likewise for dry reforming where $CO_2$ is the reactant rather than $H_2O$.

These steam reforming reactions occur in a feedstock, or process gas, comprising a mixture of hydrocarbons (such as natural gas) and steam. This feedstock is passed through a steam reforming catalyst under steam reforming conditions. The reaction is conventionally carried out in a steam reformer at high temperatures. The necessary heat for the endothermic reactions is usually supplied by combustion in a radiant furnace chamber in which the catalyst is arranged in vertical tubes extending through the furnace chamber.

The key to achieving high thermal efficiency from reforming processes is to utilise as efficiently as possible the waste heat contained in the hot product streams. The hot reformed gas product stream is typically first routed to a reformed gas boiler, specifically designed to avoid metal dusting corrosion, where high pressure steam is generated. In conventional steam methane reforming processes the quantity of steam generated significantly exceeds that necessary for the steam methane reforming process itself, necessitating export of the excess steam. This has a significant negative effect on the overall thermal efficiency of the steam methane reforming process.

Waste heat contained in combustion products exiting the reformer radiant section is conventionally recovered in a convection section by various means, such as steam generation, steam superheating, heating of feed or intermediate process streams, preheating of combustion air, or other streams. The furnace convection sections generally operate using flue gases at or near atmospheric pressure, giving rise to large and heavy equipment items.

In addition, particularly at higher capacities, conventional steam methane reformers are predominantly fabricated on site, which gives rise to high costs.

EP0195688 A2 describes a process for the steam reforming of hydrocarbons in a reforming reactor by the passage of a feed stream comprising steam and one or more hydrocarbons as process gas, under steam reforming conditions and under an external supply of heat, through a given volume of steam reforming catalyst. The process comprises: (a) passing the process gas through a first portion of the steam reforming catalyst, and then (b) passing the process gas that has been partly reformed in step (a) through the remaining portion of the steam reforming catalyst to form a product stream. The heat needed for the endothermic reaction in step (b) and for heating of the process gas is supplied by a hot flue gas, which has been generated by combustion of a fluid fuel in a burner. As the hot flue gas provides heat in this regard, it is cooled, and so forms a moderately hot flue gas. The heat needed for step (a) is supplied partly from this moderately hot flue gas and partly from the product stream.

EP1403215 A1 describes a process for the preparation of synthesis gas by catalytic steam and/or $CO_2$ reforming of a hydrocarbon feedstock. The process comprises the steps of: (a) heating the reaction mixture of hydrocarbon and steam and/or $CO_2$ in a heated steam reforming unit, which is integrated with the flue gas-containing waste heat section from a fired tubular reformer, in which reforming of the reaction mixture takes place by contact with a solid reforming catalyst, to obtain a partially steam reformed mixture; and (b) feeding the partially steam reformed mixture to the fired tubular reformer and further reforming the mixture to the desired composition and temperature. The heated steam reforming unit comprises a piping system containing reaction sections with solid reforming catalyst comprising catalyst pellets and/or catalysed structured elements, the piping system being part of the process gas piping system integrated with the flue gas-containing waste heat section. The sole source of heat provided to the process is supplied by a hot flue gas, which has been generated by combustion of a fluid fuel in a burner. Heat transfer to the heated steam reforming unit occurs principally via convection. In the main fired tubular reformer section heat transfer is principally by radiation.

As the skilled person will appreciate, a conventional burner will operate at a temperature below the fuel auto-ignition temperature. Therefore the fuel and air are firstly mixed (in a mixing zone) but do not react, and downstream of the mixing there is a "flame", which is a well-defined zone in which most or all of the combustion reactions occur.

In EP0195688 A2 and EP1403215 A1 combustion of a fluid fuel in a burner takes place separately, to generate a hot flue gas, and the hot flue gas is provided to the steam reforming process.

EP0195688 A2 explains that its heat exchange reforming process and reactor are suitable for the production of relatively small quantities of hydrogen. This is further illustrated by FIG. 2, which shows a single burner as well as a single combination of concentric tubes and thus a limited maximum production capacity.

Complete combustion at or near the stoichiometric fuel: air ratio will result in an extremely high fluid temperature, e.g. about 1,900-2,000° C. for natural gas without air or fuel preheat, unless combustion is undertaken using a large amount of excess air, addition of inert gases such as cool recycled flue gas, or use of low calorific value fuel, any of which would have a significant detrimental effect on the overall thermal efficiency of the process. Preheating of combustion air or fuel will increase the combustion products temperature further. Conversely, the use of fluids at such high combustion temperatures is prohibitive unless the adjacent process fluid containment materials are protected by materials that can withstand such temperatures on a continuous basis or are suitably cooled at a rate that can maintain a maximum design temperature over an extended operating period. In conventional steam reformer tubes; this is limited to typically 1,100° C. or thereabouts.

In addition, EP0195688 A2 shows the use of a ceramic tube surrounding the sides of, and defining, the combustion chamber. This ceramic tube will be at a temperature near to the combustion products' temperature inside the tube and therefore significant heat will be transferred from the ceramic tube by radiation to the adjacent process fluid containment walls. This is in addition to the convective heat transfer mentioned above. This radiative heat flux can greatly exceed the convective heat flux to the recipient surface.

In EP0195688 A2 there is a description of the maximum temperature of hot flue gas (combustion products) being moderated to 1370° C. by dilution with cooled recycle flue gas, thereby reducing the heat transfer effectiveness to the reforming catalyst and the overall process thermal efficiency.

EP1403215 A1 utilises both heated sections of catalyst and adiabatic (unheated) beds in the first reforming section. The solid catalyst comprises catalysed hardware in the form of catalyst pellets and/or structured elements with a catalytic layer of steam reforming catalyst. The catalysed structured elements and/or the catalyst pellets are described as being placed in any location in the heated sections and in the adiabatic reaction sections.

In the apparatus of EP1403215 A1 the heated steam reforming unit is comprised of one heating section without catalyst and one section with catalyst. These are physically separate and distinct.

One of the objectives of the present invention is to provide a process and apparatus for reforming hydrocarbons in a steam or dry reforming process with a thermal efficiency significantly higher than previously achieved.

Another objective is to provide an apparatus for reforming of hydrocarbons that can be wholly or substantially pre-fabricated, therefore reducing or eliminating costs associated with on-site fabrication.

Another objective is to provide a process and apparatus that is suitable for the production of reformed gases on both a small scale and in large industrial scale capacities, being readily scalable to industrial sizes.

SUMMARY OF THE INVENTION

The invention provides, in a first aspect, a process for steam or dry reforming of hydrocarbons in a reforming reactor, comprising the steps of:
(a) passing a feedstock, comprising one or more hydrocarbons together with steam and/or $CO_2$, through a first catalytic zone at an elevated temperature, to form a partly-reformed process gas, wherein the first catalytic zone comprises one or more elongate conduits, each containing reforming catalyst; and
(b) passing the partly-reformed process gas through a second catalytic zone at an elevated temperature, so as to form a reformed gas stream, wherein the second catalytic zone comprises one or more elongate conduits, each containing reforming catalyst;
wherein the process further comprises the combustion of a fluid fuel with a combustion-sustaining medium in an exothermic combustion region, to form a hot combustion products stream, wherein the exothermic combustion region is adjacent to and laterally surrounds each of the second catalytic zone elongate conduits, wherein the fluid fuel and the combustion-sustaining medium are separately fed to the exothermic combustion region and are then introduced to each other within said exothermic combustion region;
wherein heat for providing the elevated temperature in step (b) is directly supplied by transfer of heat from the exothermic combustion region to the second catalytic zone elongate conduits, by transfer of heat from both (i) the combustion itself and (ii) the hot combustion products stream, both convectively and by gas radiation;
whereby the hot combustion products stream is cooled by said transfer of heat to the second catalytic zone elongate conduits, to form a partly-cooled combustion products stream;
and wherein heat for providing the elevated temperature in step (a) is supplied to the first catalytic zone elongate conduits from: (i) the reformed gas stream and (ii) said partly-cooled combustion products stream;
whereby the reformed gas stream is cooled by said transfer of heat to the first catalytic zone elongate conduits, to form a cooled reformed gas product stream; and
whereby the partly-cooled combustion products stream is cooled by said transfer of heat to the first catalytic zone, to form a further-cooled combustion products stream.

The invention also provides, in a second aspect, an apparatus suitable for carrying out the process of the first aspect, wherein the apparatus comprises:
a housing, the housing containing:
a first catalytic zone comprising one or more elongate conduits, each containing reforming catalyst, and each having an inlet and an outlet, whereby in use a feedstock comprising one or more hydrocarbons together with steam and/or $CO_2$ can enter a first catalytic zone elongate conduit via its inlet and pass through said first catalytic zone elongate conduit at an elevated temperature, to form a partly-reformed process gas, which can then exit via the outlet of said elongate conduit;
a second catalytic zone comprising one or more elongate conduits, each containing reforming catalyst, and each having an inlet and an outlet, whereby in use partly-reformed process gas from the first catalytic zone can enter a second catalytic zone elongate conduit via its inlet and pass through said second catalytic zone elongate conduit at an elevated temperature, so as to form a reformed gas stream, which can then exit via the outlet of said elongate conduit;
an exothermic combustion region laterally surrounding the second catalytic zone, wherein the exothermic combustion region is associated with a plurality of burner nozzles, a fuel inlet through which fluid fuel can be provided, and a combustion-sustaining medium inlet through which combustion-sustaining medium can be provided, such that in use fluid fuel from the fuel inlet and combustion-sustaining medium from the combustion-sustaining medium inlet can be introduced to each other via said plurality of burner nozzles, and combustion of the fluid fuel with the combustion-sustaining medium can occur in the exothermic combustion region to form a hot combustion products stream, so that in use there can be transfer of heat from the hot combustion products stream to the second catalytic zone via the exothermic combustion region;
a heat recovery region, being adapted to, in use, receive heat from the reformed gas product stream and from the hot combustion products stream after it has provided heat to the second catalytic zone, and to transfer heat to the first catalytic zone;
a combustion products stream outlet, through which the combustion products stream can exit the housing after it has lost heat in the heat recovery zone; and
a reformed gas stream outlet, through which the reformed gas stream can exit the housing after it has lost heat in the heat recovery zone.

In one preferred embodiment of the apparatus of the invention, the exothermic combustion region laterally surrounds each of the second catalytic zone elongate conduits. In a further preferred embodiment of the apparatus of the invention, the exothermic combustion region is directly adjacent to and laterally surrounds each of the second catalytic zone elongate conduits.

The invention also provides, in a third aspect, a process tube assembly suitable for use in the process for steam or dry reforming of hydrocarbons according to the first aspect, the process tube assembly comprising two concentric elongate tubes (i.e. there is an inner tube and an outer tube, said tubes being provided in a concentric arrangement such that they share a common central axis),
wherein the inner tube contains a first reforming catalyst portion, with a first reforming catalyst bed,
wherein the outer tube contains a second reforming catalyst portion, with a second reforming catalyst bed,
whereby the first reforming catalyst bed and the second reforming catalyst bed are arranged in series,
whereby the inner tube has an exit through which partially reformed gas can leave the inner tube,
and whereby an internal conduit, through which partially reformed gas can flow, runs from the exit of the inner tube and passes through the second reforming catalyst portion.

In one preferred embodiment, the two concentric tubes of the process tube assembly are free to move independently in a longitudinal direction relative to one other, with there being no direct or indirect connection between the two concentric tubes, other than at a single location where their positions are fixed relative to one another. Thus the process tube assembly is an elongate process tube assembly that comprises two elongate concentric tubes directly or indirectly joined at a single location, thereby allowing free movement of each concentric tube one to the other.

The inner tube and the outer tube are each elongate and must be arranged concentrically. However, each of these tubes may have a consistent diameter along its length or may have a differing diameter along its length. Likewise, each of these tubes may have a consistent cross sectional shape along its length or may have a differing cross sectional shape along its length. They may have any suitable cross sectional shape, e.g. circular. In one embodiment the tubes both have a have a consistent diameter along their respective lengths and each have a circular cross section.

In one embodiment the outer tube surrounds most or all of the inner tube. In one embodiment part of the inner tube extends outside of the outer tube, but most of the inner tube is located within the outer tube. For example, 60% or more, or 65% or more, or 70% or more, or 75% or more, or 80% or more, or 85% or more, of the length of the inner tube may be located within the outer tube. Thus the outer tube can be considered as a sleeve within which most of the inner tube is located.

The internal conduit may suitably be located substantially centrally within the outer tube, passing through the second reforming catalyst portion that is located in the outer tube. Preferably the internal conduit runs along the central elongate axis of the outer tube. The second reforming catalyst portion may be located circumferentially around the internal conduit.

In one embodiment, the internal conduit has an entrance that is directly connected to the exit of the inner tube and this entrance can therefore receive partially reformed gas from the inner tube. The internal conduit passes through the second reforming catalyst portion in the outer tube. The internal conduit has an exit that is located between the second reforming catalyst portion and the end of the outer tube that is furthest from the inner tube. Thus the partially reformed gas exits the internal conduit at a location near to the end of the outer tube that is furthest from the inner tube.

The outer tube, the internal conduit and the second reforming catalyst portion are configured and arranged such that partially reformed gas leaves the exit of the internal conduit and then changes direction such that it passes through the second reforming catalyst portion in the opposite direction to its direction of flow through the internal conduit. The direction of flow through the first reforming catalyst portion is the same as the direction of flow through the internal conduit. Thus, in use, the process gases flow through the first and second reforming catalyst portion in opposite directions. This is beneficial because it allows the combustion gases to flow outside of the process tube assembly outer tube in a single direction.

The process tube assembly of the invention is beneficial in that it does not require any insulation to its tube walls for effective functioning.

The process tube assembly of the third aspect can be present in the apparatus of the second aspect. In this regard, the first reforming catalyst portion is part of the first catalytic zone and the second reforming catalyst portion is part of the second catalytic zone, and the internal conduit that passes through the second reforming catalyst portion provides partially reformed gas from an exit of the first reforming catalyst bed to an inlet of the second reforming catalyst bed.

In a preferred embodiment there are two or more elongate process tube assemblies of the third aspect provided in the apparatus of the second aspect, such as three or more, or four or more, or five or more, or six or more. There may be 10 or more, or 50 or more, or 100 or more, elongate reforming assemblies provided in the apparatus of the second aspect. A benefit of the present invention is that it is readily scalable and therefore can be operated with any desired number of assemblies to meet the output needs of the reforming apparatus. In one embodiment, therefore, there may be 250 or more, or 500 or more, or 750 or more, or 1000 or more, or 2000 or more, elongate reforming assemblies provided in the apparatus of the second aspect.

The process tube assembly may be supported, directly or indirectly, from a single location at the top, with the assembly free to expand downwards in tension under its own weight.

It is beneficial to have the inner and outer tubes in the assembly co-joined at a single location at the top. This results in the weight of the tubes and the weight of the catalyst acting to tension the tubes. Having both tubes operating in tension (as compared to under compression) makes the tubes less likely to laterally distort.

A single inlet and single outlet may be provided to the process tube assembly, and both inlet and outlet can be at the same end of the assembly. No connections are therefore required at the opposite end. Having all connections at the top end (the end closest to the first catalytic zone) and none at the bottom end (the end closest to the second catalytic zone) is advantageous because if connections (such as pigtails) were required at the bottom end, these would need to be designed to allow for significant deflection as the apparatus went from cold to hot.

The process tube assembly of the invention is also beneficial because it facilitates operation of both the inner and the outer tubes under a higher internal pressure relative to the pressure outside the tube assembly, i.e. positive differential pressure. This means that the tube walls are in tension, which is desirable mechanically. Prior designs such as those discussed above in EP0195688 A2 necessarily resulted in some tubes operating with negative differential pressure, i.e. with the tube walls in compression, which can be undesirable.

The elongate process tube assemblies are independent of the burner nozzles. The process tube assemblies may be unrestrained and free to move vertically to accommodate thermal expansion and contractions, both collectively and individually.

The process tube assembly of the third aspect can be provided in a vessel. In a fourth aspect, a process tube system is provided which comprises a vessel containing two or more (e.g. 3 or more, or 4 or more, or 5 or more, or 6 or more) process tube assemblies according to the third aspect. There may be 10 or more, or 50 or more, or 100 or more, elongate reforming assemblies provided in the vessel. A benefit of the present invention is that it is readily scalable and therefore can be operated with any desired number of assemblies to meet the output needs of the reforming apparatus. In one embodiment, therefore, there may be 250 or more, or 500 or more, or 750 or more, or 1000 or more, or 2000 or more, elongate reforming assemblies provided in the vessel.

Although the process tube assembly of the third aspect can be used in the process according to the first aspect and can be part of an apparatus according to the second aspect, this is not essential.

It can be appreciated that the process tube assembly can be used in a process and apparatus that do not involve the burner nozzle and combustion region arrangement as defined in the first and second aspects. The hot gas that is required to heat the catalyst in the process tube assembly could be produced remotely from (upstream from) the assembly. Therefore in one embodiment, the process tube assembly is used in a process not according to the first aspect or is provided in an apparatus not according to the second aspect, but where there is a means provided for feeding hot heating gas to the assembly.

In the following disclosure, all preferred/optional features and embodiments relate to each of the process and the apparatus and the process tube assembly of the present invention unless the context or wording clearly indicates otherwise.

Further, all preferred/optional features and embodiments may be used singly or together in any combination, unless the context or wording indicates otherwise.

The process and the apparatus of the present invention are able to reform hydrocarbons more efficiently than conventional processes and apparatus.

In particular, the present invention maximizes the use of waste heat as contained in the reformed gas product stream and combustion product stream, by using these hot streams to provide heat directly to the first catalytic zone, to perform additional (steam or dry) reforming of the feedstock. This contrasts with the traditional approach of using waste heat from reformed gas to produce steam and waste heat from high temperature combustion products to provide additional pre-heating for process stream. This new approach reduces the required energy to complete the reforming process, thus reducing the associated fuel consumption. Therefore a high thermal efficiency can be achieved.

A further benefit of the present invention is that the apparatus is readily scalable, and therefore the process and apparatus can be used on a small scale or a large scale as desired. Any desired number of elongate conduits can be provided in the first and second catalytic zones.

It should be appreciated that the combustion region laterally surrounds each second catalytic zone elongate conduit. Thus when there are multiple conduits, there is a combustion region that laterally extends around each of the second catalytic zone elongate conduits. Heat transfer surface area is therefore maximised throughout the single combustion region.

The use of an exothermic combustion region associated with a plurality of burner nozzles, a fuel inlet through which fluid fuel can be provided, and a combustion-sustaining medium inlet through which combustion-sustaining medium can be provided is beneficial because it means that the fluid fuel and the combustion-sustaining medium can be introduced to each other via said plurality of burner nozzles, and combustion of the fluid fuel with the combustion-sustaining medium can occur in the exothermic combustion region to form a hot combustion products stream.

It is beneficial having a plurality of burner nozzles and an exothermic combustion region laterally surrounding the (or each) second catalytic zone elongate conduit. Heat is provided to the second catalytic zone in an efficient manner. Each burner nozzle can supply heat to more than one second catalytic zone elongate conduit. The design is also readily scalable.

In one preferred embodiment the number of burner nozzles is greater than the number of second catalytic zone elongate conduits.

In the process of the invention, heat for providing the elevated temperature in step (b) is supplied from the exothermic combustion region to the second catalytic zone by transfer of heat from both (i) the combustion itself and (ii) the hot combustion products stream. Further, the transfer of heat occurs both convectively and by gas radiation.

In the present invention heat is provided by a combustion region, in which a combustion-sustaining medium and fluid fuel undertake combustion.

In the process of the invention, heat for providing the elevated temperature in step (b) is supplied directly to the second catalytic zone from an adjacent and laterally surrounding exothermic combustion region, by transfer of heat from both (i) the combustion itself and (ii) the hot combustion products stream, both convectively and by gas radiation.

Thus in the process of the invention, heat is transferred not only by combustion products but also by their precursors, heated fuel, heated combustion air and partially combusted material formed during the combustion process. Heat transfer is via gas radiation and convection from the flowing gases. Heat is removed into the second catalytic zone during the combustion process, which occurs over a finite volume.

This arrangement means that the peak temperature of the combustion products is moderated as compared to having complete combustion take place before any heat transfer, i.e. with total heat transfer from flue gas products, as in EP0195688 A2. The flowing process gases within the second catalytic zone elongate conduit(s), and the endothermic reaction therein, directly absorb and transfer heat during the combustion. This means that the temperatures of the conduit walls in the second catalytic zone can be kept to within acceptable mechanical design limits. There is no need to transfer and distribute hot combustion products at very high temperatures.

In one preferred embodiment of the apparatus of the invention, the plurality of burner nozzles, fuel inlet and combustion-sustaining medium inlet are arranged relative to the second catalytic zone such that, in use, there can be direct transfer of heat from the exothermic combustion region to the second catalytic zone by transfer of heat from both (i) the combustion itself and (ii) the hot combustion products stream, both convectively and by gas radiation. Suitably, the apparatus is configured and arranged such that the exothermic combustion region laterally surrounds and is directly adjacent to the second catalytic zone elongate conduit(s).

In a preferred embodiment, each elongate conduit containing reforming catalyst has only a single containment wall for the purpose of heat transfer from a heat source to the reforming catalyst therein.

In a preferred embodiment, the elongate conduit containing reforming catalyst in the first catalytic zone receives heat directly and convectively, through a single containment wall, only from the reformed gas stream. In a preferred embodiment, the elongate conduit containing reforming catalyst in the second catalytic zone receives heat directly only from combustion products.

In one embodiment, there is a plurality of second catalytic zone elongate conduits.

In one embodiment, the burner nozzles and the second catalytic zone elongate conduits are arranged such that each burner nozzle provides heat to a plurality of elongate conduits.

In a preferred embodiment, the second catalytic zone elongate conduits and the burner nozzles are arranged in a regular array, orthogonal to the flow of the combustion products stream and the feedstock.

It may be that the method or apparatus of the invention involves use of a process tube assembly, which comprises both a first catalytic zone elongate conduit and a second catalytic zone elongate conduit. Thus a single assembly provides (a) a first catalytic zone comprising an elongate conduit which has an inlet and an outlet and which contains reforming catalyst, and (b) a second catalytic zone comprising an elongate conduit which has an inlet and an outlet and which contains reforming catalyst. The first catalytic zone elongate conduit and the second catalytic zone elongate conduit are suitably longitudinally aligned with each other in the process tube assembly. Thus the process tube assembly may be elongate and its central longitudinal axis may correspond with the central longitudinal axis of the first catalytic zone elongate conduit and the central longitudinal axis of the second catalytic zone elongate conduit.

In one embodiment, the invention uses one or more such process tube assemblies and in particular the housing of the apparatus may contain one or more such process tube assemblies.

In one embodiment, each process tube assembly comprises two concentric tubes, with each inner tube containing a first reforming catalyst portion, with a first reforming catalyst bed, and each outer tube containing a second reforming catalyst portion, with a second reforming catalyst bed, arranged in series, and whereby an internal conduit passes through the second reforming catalyst portion for the purpose of providing partially reformed gas from an exit of the first reforming catalyst bed to an inlet of the second reforming catalyst bed. The first reforming catalyst portion is part of the first catalytic zone and the second reforming catalyst portion is part of the second catalytic zone.

Thus in one embodiment, the method or apparatus of the invention involves use of a process tube assembly according to the third aspect of the invention.

In one preferred embodiment, the two concentric tubes have their positions relative to one another fixed at a single location but they are otherwise free to move relative to one another. The tubes may be fixed directly or indirectly.

The apparatus of the invention may be described as a Double Convective Reformer (DCR), due to the manner in which it works.

Particular beneficial features of the invention are:

1. The process of the invention, whereby high grade waste heat from reaction products is provided to carry out a significant portion of the steam or dry reforming reactions, confers a very high thermal efficiency across the apparatus.

2. The use of high grade waste heat from reformed gas to carry out a significant portion of the steam reforming reactions negates the need to generate steam in the process of the invention. In traditional steam reforming plants, the normal excess of steam is often exported. Additionally, the steam export is normally included in the stated overall energy efficiency of a steam reforming plant, whether utilised in a useful or efficient manner or not.

3. The apparatus of the invention confers low specific capital costs, i.e. cost per unit synthesis gas produced, due to one or more of the following: high throughput through each elongate conduit assembly and the ability to have close spacing thereof, the ability to have high space velocities through catalysts, the mechanical simplicity of the elongate conduit assemblies, the ability to have conduits with thin walls, and with no on-site fabrication of the apparatus being required.

4. The low weight of the apparatus compared to traditional steam reformers results in significantly reduced thermal inertia—meaning more rapid and low-cost start-ups and shut-downs.

5. The apparatus of the invention has a large capacity range and is not location specific; there is no requirement for on-site fabrication, and the capacity of the apparatus is limited only by vessel fabrication or transportation size. For example, a single 5 m diameter reformer is capable of producing sufficient synthesis gas for the production of up to 2,400 metric tons per day of methanol, or 210,000 $Nm^3/hr$ of pure hydrogen. Operation using a single elongate conduit (process tube) assembly is particularly suitable for production at low capacity.

6. The invention can be used wherever traditional hydrocarbon steam reformers are used, including in production of synthesis gas, hydrogen, ammonia, methanol, Fischer Tropsch synthesis liquids and dimethyl ether.

In addition, the apparatus of the invention is simple in terms of design and construction, and may have the following mechanical features:

The apparatus may include elongate process tube assemblies that comprise two concentric tubes directly or indirectly joined at a single location, thus allowing free movement of each concentric tube one to the other.

No seals or thermal expansion devices, such as bellows, are required in or around the assembly to account for vertical differential expansion therein.

Each elongate process tube assembly may be supported, directly or indirectly, from a single location at the top, with the assembly free to expand downwards in tension under its own weight.

A single inlet and single outlet may be provided to each elongate process tube assembly, both at the same end. No connections are required at the opposite end. Having all connections at the top end (the end closest to the first catalytic zone) and none at the bottom end (the end closest to the second catalytic zone) is advantageous because if connections (such as pigtails) were required at the bottom end, these would need to be designed to allow for significant deflection as the apparatus went from cold to hot.

The elongate process tube assemblies are independent of the burner nozzles. The process tube assemblies may be unrestrained and free to move vertically to accommodate thermal expansion and contractions, both collectively and individually.

Likewise, the process tube assembly of the invention is simple in terms of design and construction, and may have the following mechanical features:

The process tube assembly comprises two concentric tubes which may be directly or indirectly joined at a single location, thus allowing free movement of each concentric tube one to the other.

No seals or thermal expansion devices, such as bellows, are required in or around the assembly to account for vertical differential expansion therein.

In use, each process tube assembly may be supported, directly or indirectly, from a single location at the top, with the assembly free to expand downwards in tension under its own weight.

A single inlet and a single outlet may be provided to each process tube assembly, both at the same end. No connections are required at the opposite end. Having all connections at the top end (the end that, in use, is closest to the first catalytic zone) and none at the bottom end (the end that, in use, is closest to the second catalytic zone) is advantageous because if connections (such as pigtails) were required at the bottom end, these would need to be designed to allow for significant deflection as the apparatus went from cold to hot.

In use, the process tube assemblies are independent of the burner nozzles. The process tube assemblies may be unrestrained and free to move vertically to accommodate thermal expansion and contractions, both collectively and individually.

It is particularly beneficial that in the present invention a large amount of waste heat can be utilised for additional reforming in a practical way, and free from temperature constraints, by the use of burner nozzles within the combustion region, rather than by total fuel combustion upstream of the reforming sections. Excessive high temperatures (normally>1,900° C.) and heat transfer at the upstream end of the tube arrangement, due to high temperature combustion products, are eliminated.

The present invention also provides a practical arrangement for containing the catalyst sections, arranging the flows and managing the heat transfer in a simple, robust mechanical device.

DETAILED DESCRIPTION OF THE INVENTION

The process of the current invention uses a novel combination of technical features to allow the high temperatures inherent in near stoichiometric combustion of a fluid fuel with air. The technical benefits of the claimed combination of features have not previously been recognised.

In the process, combustion air (or other combustion-sustaining medium, for example a mixture of oxygen and $CO_2$) and a fluid fuel are separately fed to a combustion region which also contains therein and throughout conduits containing the second reforming catalyst. Combustion air (or other combustion-sustaining medium) and fuel undertake combustion via one or more burner nozzles within the combustion region.

Heat may suitably be removed simultaneously and directly into adjacent conduits containing the process gas and second catalyst volume during the combustion process, i.e. heat is transferred not only by "flue gas" (i.e. combustion products) alone but also by their precursors, heated fuel, heated combustion air and partially combusted material formed during the combustion process. Heat transfer is via radiation and convection from the flowing gases.

In a preferred embodiment combustion occurs in the combustion region using air or other combustion-sustaining medium at a temperature such that the fluid fuel undergoes auto-ignition with the combustion-sustaining medium (e.g. combustion air). Thus combustion can be achieved via a turbulent diffusion flame mechanism. Total combustion can occur over a fuel/air mixing length that allows combustion heat to be removed simultaneously to the process gas in the second catalyst volume whilst not exceeding modest and typical conduit design temperatures.

By having combustion arranged to occur above the auto-ignition temperature, there is no flame, as such, or flame front. Combustion is defined by the "mixed is burnt" model whereby as soon as fuel or partly combusted fuel is mixed with combustion-sustaining medium, combustion occurs—effectively instantaneously. Therefore the location at which combustion occurs, and particularly the location in terms of downstream length, is determined by the mixing rate of the fuel and combustion-sustaining medium. This can, within limits, be controlled in design by adjusting the relative and absolute velocities of the fuel and combustion-sustaining medium, which determine the rate of mixing. For example, a high differential velocity between fuel and combustion-sustaining medium will tend to induce a shorter mixing zone and provide higher local heat fluxes to the adjacent process tubes. Longer profiles with lower fluxes can be achieved by reducing the differential velocities.

The apparatus of the present invention is designed for production of reformed gases in both small and large industrial scale capacities. It is able to utilise numerous burner nozzles within the apparatus and it is able to utilise multiple elongate conduits (process tubes). In one embodiment there may be approximately one burner nozzle per second catalytic zone elongate conduit, and in another embodiment there may be more than one burner nozzle per second catalytic zone elongate conduit, such as two or more burner nozzles per second catalytic zone elongate conduit.

These features are important in being able to build a practical device of industrial capacity and with high thermal efficiency.

By virtue of the unique mechanical arrangement and high thermal efficiency of the current invention, reformed gas and combustion products with exit temperatures below 500° C. and 600° C. respectively can readily be achieved by the process, more preferably below 480° C. and 550° C. respectively.

In particular, it may be that the reformed gas product stream exits the apparatus at a temperature of 500° C. or less, such as 490° C. or less, or 480° C. or less, e.g. from 300 to 500° C. or from 450 to 490° C. or from 400 to 480° C.

It may be that the combustion products stream exits the apparatus at a temperature of 600° C. or less, such as 575° C. or less, or 550° C. or less, e.g. from 350 to 600° C. or from 425 to 575° C. or from 450 to 550° C.

However, the above values are exemplary rather than limiting. If higher reformed gas exit temperatures and/or higher combustion products exit temperatures were required the skilled reader will appreciate that these could be accommodated by design.

In one preferred embodiment, a first catalytic zone elongate conduit and a second catalytic zone elongate conduit are longitudinally aligned to form an elongate reforming assembly. It may be that there is a single vessel containing one or more such elongate reforming assemblies. It may be that the position of the first catalytic zone elongate conduit and the second catalytic zone elongate conduit relative to one another is fixed at a single location, either by direct attachment of the conduits to one another or indirectly, due to the presence of additional components which secure the positions of the conduits at one location.

In one preferred embodiment, a first catalytic zone elongate conduit is directly or indirectly attached to a second catalytic zone elongate conduit to form an elongate reforming assembly. It may be that there is a single vessel containing one or more such elongate reforming assemblies.

In one embodiment there is a single elongate reforming assembly provided in the vessel. In a preferred embodiment there are two or more elongate reforming assemblies provided in the vessel, such as three or more, or four or more, or five or more, or six or more. There may be 10 or more, or 50 or more, or 100 or more, elongate reforming assemblies provided in the vessel.

A benefit of the present invention is that it is readily scalable and therefore can be operated with any desired number of assemblies to meet the output needs of the reforming apparatus. In one embodiment, therefore, there may be 250 or more, or 500 or more, or 750 or more, or 1000 or more, or 2000 or more, elongate reforming assemblies provided in the vessel.

First Catalytic Zone

The present invention includes a first catalytic zone, in which a feedstock comprising one or more hydrocarbons together with steam and/or $CO_2$ is converted into a partly-reformed process gas. This occurs at elevated temperature, and in the presence of a catalyst.

It is preferred that the feedstock is at a temperature of 500° C. or less when it enters the first catalytic zone, such as 450° C. or less or 400° C. or less, e.g. from 300 to 450° C. or from 325 to 400° C. or from 350 to 400° C.

The one or more hydrocarbons in the feedstock may be provided in the form of any suitable hydrocarbon product suitable for undergoing steam or dry reforming. Non-limiting examples are natural gas, LPG, naptha, kerosene, refinery off-gases, biogas and methanol, or any combinations thereof.

In one embodiment, the feedstock is fed through a pre-reformer before it reaches the first catalytic zone. The pre-reformer is therefore upstream of, and external to, the first catalytic zone. Pre-reformers are known in the art. The pre-reformer acts to remove components heavier than methane. This serves to avoid gum formation or carbon deposition via thermal cracking at low temperatures in the first catalytic zone. The pre-reformer will suitably also remove trace contaminants, such as sulphur and chlorine, which would otherwise slowly poison the reforming catalyst.

The first catalytic zone comprises an elongate conduit, which contains reforming catalyst. The reforming catalyst may be provided in the form of a catalyst bed. The elongate conduit has a feedstock inlet, such that the feedstock comprising one or more hydrocarbons together with steam and/or $CO_2$ can enter into the conduit and come into contact with the catalyst.

There may be any suitable number of first catalytic zone elongate conduits, e.g. two or more or three or more, or four or more, or ten or more, or 15 or more, or 20 or more, or 50 or more, or 100 or more. In one embodiment, there may be 250 or more, or 500 or more, or 750 or more, or 1000 or more, or 2000 or more. When there are two or more elongate conduits these may suitably run parallel to one another. They may be arranged in a regular array. In one embodiment the elongate conduits run parallel to one another and are arranged in a repeating triangular or square array.

In one embodiment, there are multiple first catalytic zone elongate conduits and the feedstock for all the conduits enters the apparatus housing together, as a single feedstock stream. It may be that there is a single combined feedstock inlet which runs from outside the apparatus housing to a chamber or plenum inside the apparatus housing. The chamber or plenum then has multiple outlets, each being a feedstock inlet for one of the first catalytic zone elongate conduits.

Alternatively, there may be multiple first catalytic zone elongate conduits and the feedstock for all the conduits enters the apparatus housing via multiple feedstock inlets, e.g. 2 or 4 feedstock inlets. The inlets may be spaced apart, e.g. there may be 1 or 2 feedstock inlets on each side of the apparatus. The feedstock inlets may run from outside the apparatus housing to a chamber or plenum inside the apparatus housing. The chamber or plenum then has multiple outlets, each being a feedstock inlet for one of the first catalytic zone elongate conduits.

It may be that when there are multiple elongate conduits the invention uses a "header and lateral" system, as known in the art, for providing the feedstock. Thus feedstock stream from outside the apparatus housing can feed into number of tubes or pipes (headers) within the apparatus housing before then in turn feeding multiple smaller tubes (laterals) within the apparatus which provide the feedstock to the multiple elongate conduits. Therefore the feedstock runs from a location outside the apparatus housing to the multiple elongate conduits via the "header and lateral" system.

The feedstock passes through the elongate conduit, and the contact with the catalyst at elevated temperature results in the formation of partly-reformed process gas. In other words, in the first catalytic zone the reforming process has progressed in part, but not to completion. For example, where the feedstock comprises natural gas, it may be that some but not all of the methane has been converted and essentially all of the higher hydrocarbons have been converted to hydrogen and carbon oxides.

The partly-reformed process gas that is formed within the first catalytic zone elongate conduit then exits the conduit via a gas outlet.

A key feature of the invention is that heat for providing the elevated temperature in the first catalytic zone is supplied to the first catalytic zone from: (i) a partly-cooled combustion products stream and (ii) a reformed gas stream. These sources of heat will be described in more detail later in the present application.

In one embodiment, heat is provided to the first catalytic zone such that the partly-reformed process gas exits the first catalytic zone at a temperature of 650° C. or more, such as 700° C. or more or 750° C. or more, e.g. from 650 to 900° C. or from 700 to 850° C. or from 750 to 800° C.

Such high intermediate temperatures are beneficial in terms of maximising the overall amount of reforming that occurs in the process of the invention.

Second Catalytic Zone

The present invention includes a second catalytic zone, in which the partly-reformed process gas that is formed within the first catalytic zone is converted to a reformed gas stream. This occurs at elevated temperature, and in the presence of a catalyst.

It is preferred that the partly-reformed process gas enters the second catalytic zone at a temperature of 650° C. or more, such as 700° C. or more or 750° C. or more, e.g. from 650 to 900° C. or from 700 to 850° C. or from 750 to 800° C. This is beneficial in terms of maximising the overall amount of reforming that occurs in the process of the invention.

The second catalytic zone comprises an elongate conduit which contains reforming catalyst. The reforming catalyst may be provided in the form of a catalyst bed. The second catalytic zone elongate conduit has a partly-reformed gas inlet, such that the partly-reformed process gas from the first catalytic zone can enter into the conduit and come into contact with the catalyst. There may be any suitable number of second catalytic zone elongate conduits, e.g. two or more, or three or more, or four or more, or ten or more, such as 50 or more or 100 or more. In one embodiment, there may be 250 or more, or 500 or more, or 750 or more, or 1000 or more, or 2000 or more. When there are two or more second catalytic zone elongate conduits these may suitably run parallel to one another. They may be arranged in a regular array. In one embodiment the elongate conduits run parallel to one another and are arranged in a repeating triangular or square array.

The partly-reformed process gas passes through the second catalytic zone elongate conduit, and the contact with the catalyst at elevated temperature results in the formation of a reformed gas stream. In other words, in the second catalytic zone the reforming process progresses towards completion.

The skilled person will appreciate that in practice a reforming process is never quite complete—there is always an "approach to equilibrium". Therefore the present invention does not require the reforming process to complete, but in the second catalytic zone the process can achieve a reformed gas stream with the desired methane concentration.

The reforming that occurs in the second catalytic zone results in a reformed gas stream that has a composition, e.g. in terms of $H_2$ content, which makes it a useful end product.

The reformed gas stream that is formed within the second catalytic zone elongate conduit then exits the conduit via a gas outlet. This reformed gas stream is hot and passes to the heat exchange region where heat is transferred to the first catalytic zone.

A key feature of the invention is that heat is provided to the second catalytic zone from an exothermic combustion region that extends laterally around the second catalytic zone, where heat is generated in the combustion region by fluid fuel and combustion-sustaining medium undergoing combustion.

The process of the invention requires that heat for providing the elevated temperature in the second catalytic zone is supplied from an exothermic combustion region adjacent to, and extending laterally around, the second catalytic zone. The heat is supplied by transfer of heat from both (i) the combustion itself and (ii) the combustion products stream, and both convectively and by gas radiation.

These sources of heat will be described in more detail later in the present application.

In one embodiment, heat is provided to the second catalytic zone such that the reformed gas stream exits the second catalytic zone at a temperature of 750° C. or more, e.g. 800° C. or more or 850° C. or more, such as 900° C. or more, or 950° C. or more, e.g. from 750° C. to 1100° C., or from 800° C. to 1100° C., or from 850° C. to 1050° C., or from 900 to 1050° C., or from 950 to 1000° C.

Combustion Region

A key feature of the present invention is the use of a combustion region where fluid fuel and combustion-sustaining medium undergo combustion, generating heat.

Heat can be transferred not only by the end products of combustion but by their precursors, heated fuel, heated combustion air and partially combusted material formed during the combustion process.

Specifically, the present invention involves the combustion of a fluid fuel with a combustion-sustaining medium in an exothermic combustion region, to form a combustion products stream. The exothermic combustion region laterally surrounds each elongate conduit in the second catalytic zone.

The fluid fuel and the combustion-sustaining medium are separately fed to the exothermic combustion region and are then introduced to each other within said exothermic combustion region, e.g. via one or more, and in particular a plurality of, burner nozzles. The burner nozzles may distribute fuel into the combustion sustaining medium or may distribute combustion sustaining medium into the fuel; the former is preferred.

Therefore, significantly, the combustion takes place during the reforming process. Preferably this takes place directly alongside and parallel to the second catalytic zone where the reformed gas stream is formed. Therefore in one embodiment, the one or more burner nozzles are arranged so as to direct fuel and combustion-sustaining medium substantially parallel to the second catalytic zone elongate conduit(s).

Accordingly, the heat for supporting the endothermic reforming reaction is generated in situ. It is directly transferred from the exothermic combustion region to the second catalytic zone.

In the process of the invention, the heat for supporting the endothermic reforming reaction is not provided solely from combustion products, e.g. a flue gas. Instead, heat for providing the elevated temperature that is required for the reforming reaction in the second catalytic zone is supplied by transfer of heat from both (i) the combustion itself and (ii) the combustion products stream. Further, this heat is provided both convectively and by gas radiation.

The apparatus of the invention includes multiple (a plurality of) burner nozzles. Multiple refers to two or more, such as three or more or four or more or five or more or six or more, e.g. 10 or more or 50 or more or 100 or more. In one embodiment, there may be 250 or more, or 500 or more, or 750 or more, or 1000 or more, or 2000 or more.

In one embodiment, the fluid fuel and the combustion-sustaining medium are introduced to each other within said exothermic combustion region via two or more burner nozzles and the total number of burner nozzles present is greater than the number of elongate conduits in said second catalytic zone.

In one preferred embodiment each elongate conduit in the second catalytic zone is provided with a part of the heat from one or more burner nozzles, preferably from two or more burner nozzles, more preferably from three or more burner nozzles or four or more burner nozzles. It is preferred that the elongate conduit receives heat from the exothermic combustion zone initially from two or more different burner nozzles around its outer circumference, such as three or more or four or more different burner nozzles.

In a preferred embodiment, the invention uses an approach that utilises the high temperatures inherent in a near-stoichiometric combustion of a fluid fuel with air or another combustion-sustaining medium.

In a preferred embodiment, air, as a combustion-sustaining medium, and a fluid fuel are separately fed to the combustion region which also contains therein and throughout elongate conduits (tubes) containing a second reforming catalyst. These conduits (tubes) containing a second reforming catalyst form the second catalytic zone. Combustion air and fuel undertake combustion via one or more burner nozzles within the combustion zone. Heat is removed simultaneously and directly into the adjacent conduits containing the process gas and second reforming catalyst during the combustion process, which occurs over a finite volume. In other words, heat is transferred not only by combustion products alone but their precursors, heated fuel, heated combustion air and partially combusted material formed during the combustion process. Heat transfer is via gas radiation and convection from the flowing gases. The flowing process gases within the conduit and catalyst and the endothermic reaction therein absorb and transfer heat, thereby reducing the tube wall temperatures to within acceptable mechanical design limits.

A benefit of the present invention is that the peak temperature for the combustion products is moderated as compared to if complete combustion were to take place before any heat transfer (cooling), i.e. with total heat transfer thereafter.

The arrangement of the present invention obviates the need to transfer and distribute hot combustion products at high temperature, typically in excess of 2,000° C., upstream of the process tubes (elongate conduits), which would present practical difficulties, with lower associated refractory integrity and increased costs.

Distribution of the combustion sustaining medium of the present invention may be limited to the temperature desired for auto-ignition of the fuel and the combustion-sustaining medium, which is typically less than 650° C.

A high inlet temperature for combustion products would result in higher process tube wall temperatures at the hot end of the process tubes (elongate conduits) for a given reformed gas exit temperature, therefore requiring either an increase in tube design temperature or a reduction in the temperature of partially reformed gas, which would reduce the overall process efficiency. Therefore it is advantageous that the present invention permits the use of combustion products or combustion sustaining medium inlet gases that do not have such high temperatures.

In order to minimize the heat transfer surface area of the process tubes (elongate conduits) it is necessary to maximise, as far as practicable, the heat flux from combustion to the process fluids. This is achieved by undertaking combustion of fuel and air, without dilution, at or near stoichiometric ratio. This gives the maximum combustion temperature for the fuel/air mixture and the maximum thermal efficiency.

Therefore in a preferred embodiment the combustion of the fuel and the combustion-sustaining medium, e.g. air, takes place without dilution, at or near a stoichiometric ratio.

In a preferred embodiment combustion occurs in the combustion region using partially preheated air, at a temperature such that the fluid fuel undergoes auto-ignition with the combustion air. Combustion is suitably achieved via a turbulent diffusion flame mechanism.

In a preferred embodiment, total combustion occurs over a fuel/air mixing length that allows combustion heat to be removed simultaneously into the second catalytic zone whilst not exceeding modest and typical conduit design temperatures.

The high thermal efficiency of the present invention means that there may be insufficient waste heat in the overall process to preheat the combustion-sustaining medium (usually combustion air), e.g. to the temperature required to ensure auto-ignition of the fuel/air mixture in the combustion region, in addition to providing heat for other duties such as for provision of steam for the reformer feed, for preheating feedstock for desulphurisation and for preheating of feedstock for pre-reforming.

Therefore an external heat supply may be required if the combustion-sustaining medium is to be preheated.

It remains preferred to preheat the combustion-sustaining medium. Therefore in one embodiment preheated combustion-sustaining medium (e.g. preheated air) is provided by:
utilizing hot air from another source, such as a gas turbine air compressor,
indirect heating, using external waste heat,
direct heating from combustion of fuel upstream of the reformer, or a combination of two or more of these.

In one embodiment, preheated combustion-sustaining medium is provided based on a combination of indirect heating using waste heat and by direct heating from combustion of a part of the total fuel used in the process of the invention in the combustion air supply upstream of the burner nozzles which are situated in the combustion region of the reformer. The direct heating may be via one or more separate burner nozzles within, or upstream of, the reforming apparatus.

In one embodiment, a start-up burner is provided to preheat the combustion-sustaining medium and to heat the apparatus from cold or to maintain suitable temperatures within the apparatus during a temporary shutdown of the reforming plant. This can be provided within or upstream of the reforming apparatus.

Suitably, the start-up burner may be operated continuously, for provision of some or all of the required preheating of the combustion-sustaining medium.

In a preferred embodiment, the combustion-sustaining medium is preheated to a temperature of 400° C. or more, or 500° C. or more, or 600° C. or more, such as from 500 to 800° C., or from 600 to 750° C., e.g. about 650° C. The combustion-sustaining medium is therefore suitably provided to the combustion region at such an elevated (preheated) temperature.

In order to maximise the thermal efficiency of the process, fluid fuel in the form of fuel gas may usefully be supplied to the combustion region in a preheated form (as long as the temperature is still below that where cracking or degradation of the fuel would occur). An increase in the temperature of the fuel gas allows for a reduction in the temperature of the combustion-sustaining medium, if desired, whilst still maintaining auto-ignition.

Therefore it can be useful, in one embodiment, to use preheated fuel which is at a temperature of up to 400° C., e.g. from 100 to 400° C. or from 200 to 400° C., or from 300 to 400° C., or from 350 to 400° C., such as at about 380° C.

Nickel based steam reforming catalysts can be poisoned by sulphur-containing compounds. Therefore any such compounds in the hydrocarbons for the feedstock will normally be removed to a low level, to obtain a desulphurised hydrocarbon starting material, prior to the steam or dry reforming. This is achieved by use of a desulphurisation unit, as known in the art. Such a unit can, for example, use a combination of hydro-desulphurisation catalyst and a hydrogen sulphide adsorbent such as zinc oxide. In one embodiment, therefore, the one or more hydrocarbons for the feedstock are fed through a desulphurisation unit before they reach the first catalytic zone, and preferably before they reach a pre-reformer located upstream of the first catalytic zone.

It may be that a portion is taken from this desulphurised hydrocarbon starting material, prior to steam/$CO_2$ addition, and is provided as natural gas fuel to the combustion region.

This preheated natural gas fuel may be at a temperature of up to 400° C., e.g. from 200 to 400° C. or from 300 to 400° C., such as from 350 to 400° C., e.g. about 380° C.

When a pre-reformer is used, this can further remove traces of sulphur left after the desulphurisation unit treatment.

Desulphurisation of the fuel may be beneficial when processing of the combustion products is undertaken downstream, such as when $CO_2$ capture is used, for example.

The highest thermal efficiency for the present invention is achieved by operating at stoichiometric air/fuel ratio. However, the present invention is designed to be able to operate with an oxygen concentration of 0.5% in the combustion products.

It should be noted that any maldistribution of combustion air or fuel will be expected to result in lower than design (stoichiometric) combustion product temperatures, and thus lower than design wall temperatures. Any maldistribution will be observed by increased oxygen and/or CO concentration in the downstream combustion products.

In one embodiment, the combustion products at the exit of the reforming apparatus contain <2% mol, preferably <1% mol, more preferably <0.5% mol of oxygen.

In order to maximise thermal efficiency of the reforming process and to minimize heat transfer surface area within the apparatus, combustion is undertaken as close to stoichiometric ratio as practicable.

Operation close to stoichiometric ratio requires adequate distribution of both fuel and combustion air to the combustion region. Methods for distribution of gases are well known, and any suitable means may be employed.

The combustion products as produced in the combustion region and that reach the heat transfer region suitably have a temperature of 1500° C. or less, such as 1400° C. or less, e.g. 1250° C. or less. In one embodiment, the combustion products at the exit of the combustion region have a temperature of 750 to 1500° C., such as from 800 to 1400° C., e.g. from 900 to 1250° C.

In one embodiment, the combustion products as produced in the combustion region and that reach the heat transfer region have a temperature of 1300° C. or less, e.g. 1100° C. or less. In one embodiment, the combustion products at the exit of the combustion region have a temperature of 850 to 1500° C., such as from 950 to 1300° C., e.g. from 1000 to 1100° C.

In one embodiment, the difference in temperature between the reformed gas stream (as it exits the second catalytic zone) and the combustion products stream (at the exit of the combustion region) is from 50 to 250° C. or from 50 to 200° C.; especially from 75 to 150° C.

A higher difference in temperature between the reformed gas and the combustion products leads to lowering of thermal efficiency but reduced surface areas and cost, whereas a lower difference in temperature between the reformed gas and the combustion products leads to the reverse. The skilled person will appreciate that selecting a suitable difference in temperatures is an optimisation exercise and can be selected depending on the desired properties for the process.

Arrangement of Elongate Conduits and Burner Nozzles

As noted above, the exothermic combustion region is adjacent to and laterally surrounds the second catalytic zone. The second catalytic zone comprises one or more elongate tubes, and the exothermic combustion region may comprise one or more burner nozzles.

In one embodiment, therefore, there are one or more burner nozzles arranged with respect to one or more elongate tubes of the second catalytic zone.

In one embodiment, a triangular or square arrangement of alternating burner nozzles and elongate tubes is used. An approximately equal number of burner nozzles and elongate tubes may be used.

FIG. 6a shows a square pitch array and FIG. 6b shows a triangular pitch array.

At the walls of the housing within which the second catalytic zone and the exothermic combustion region are provided, additional burner nozzles may be present. These may, in one embodiment, be smaller in size than the reminder of the burner nozzles.

Once fuel flows from each burner nozzle, mixing with combustion sustaining medium will start immediately, as will associated combustion and heat flow. Mixing of fuel and combustion sustaining medium will occur both upwards and circumferentially around each tube. Therefore heat input circumferentially into the tubes will be more even/balanced as the gases flow upwards.

Balanced (not necessarily equal) heat input circumferentially around each tube in the combustion zone is beneficial. Uneven heat input could result in "bowing" of the tubes (heating one side more than the other), which in turn could then lead to further heat input misdistribution.

Therefore there is a benefit to having a regular array of burner nozzles arranged with respect to the elongate tubes of the second catalytic zone. In particular, the preferred layout is either a triangular or a square pitch with alternating burner nozzles and elongate tubes. Overall, when discounting additional burner nozzles that may be present at the walls, preferably there are approximately the same numbers of burner nozzles and elongate tubes in the regular array.

Heat for the First Catalytic Zone

In the present invention, as discussed above, there is an exothermic combustion region in which combustion of a fluid fuel with a combustion-sustaining medium takes place, to form a hot combustion products stream. This hot combustion products stream provides heat to the second catalytic zone, and is, as a consequence, cooled by said transfer of heat to the second catalytic zone, to form a partly-cooled combustion products stream.

This partly-cooled combustion products stream then provides heat to the first catalytic zone.

In addition, heat is provided to the first catalytic zone from the reformed gas stream, as formed in the second catalytic zone.

Therefore waste heat is directly utilised in providing the required heat to support the endothermic catalytic reforming and sensible heating of hydrocarbon-containing feedstock in the first catalytic zone.

The reformed gas stream is cooled by this transfer of heat to the first catalytic zone, thus reducing the amount of lower grade waste heat required to be recovered downstream of the reformer. In one beneficial embodiment the reformed gas is cooled so as to reduce or eliminate the risk of metal dusting corrosion downstream.

Meanwhile, the partly-cooled combustion products stream is also cooled by this transfer of heat to the first catalytic zone thus reducing the amount of lower grade waste heat required to be recovered downstream of the reformer and increasing the thermal efficiency across the apparatus.

In one embodiment, additional heat may be provided to the first catalytic zone by the use of a bed of inert material, e.g. in the form of particulates or other shaped devices. This can in particular be beneficial to ensure that the feedstock is hot enough when it reaches the catalyst in the first catalytic zone, such that the catalyst can operate effectively. In such an embodiment the feedstock passes over a bed of inert material before it reaches the catalyst bed. Heat is provided to the inert material, and thus to the feedstock that passes over the inert material, by the partly-cooled combustion products stream and the reformed gas stream, in the same manner as discussed above.

The bed of inert material is therefore installed upstream of the catalyst bed in the elongate conduit(s) in the first catalytic zone in order to increase the feedstock temperature prior to it contacting the catalyst.

Heat Transfer in the First Catalytic Zone

It is desirable to maximise heat transfer to the first catalytic zone, whilst minimizing the required heat transfer area. Maximising the heat transfer requires minimising the temperature differences between reformed gas and feedstock at the inlet and outlet of the first catalytic zone. Minimising the heat transfer area requires maximising the same temperature differences.

Preferably the temperature difference between the feedstock and the adjacent reformed gas stream at any heat transfer interface in the first catalytic zone is 300° C. or less, especially 250° C. or less, e.g. from 20 to 300° C. and preferably in the range of from 50 to 250° C., such as from 100 to 300° C. or from 150 to 250° C.

Thus an acceptable optimum average temperature difference (LMTD) between hot and cold fluids is desired.

In a preferred embodiment, the reformed gas stream flows counter-currently and in indirect heat exchange contact with the feedstock, such that heat is transferred from the reformed gas stream to the feedstock. Simultaneously, the partly-cooled combustion products stream flows counter-currently and in indirect heat exchange contact with the feedstock, such that heat is transferred from the partly-cooled combustion products stream to the reformed gas stream.

Therefore the reformed gas stream is at its highest temperature at the feedstock outlet end of the conduit, and cools as it passes towards the feedstock inlet end of the conduit, as heat is transferred to the feedstock. Meanwhile, the feedstock is at its highest temperature at the feedstock outlet end of the conduit, as heat is transferred from the reformed gas stream.

This design allows an acceptable optimum average temperature difference (LMTD) between hot and cold fluids to be achieved.

In one configuration of this embodiment the reformed gas stream flows counter-currently and in indirect heat exchange contact with the feedstock, and simultaneously the partly-cooled combustion products stream flows co-currently in indirect heat exchange contact with reformed gas stream, such that heat is transferred from the partly-cooled combustion products stream to the reformed gas stream, and heat is transferred from the reformed gas stream to the feedstock.

In another configuration of this embodiment, the reformed stream flows counter-currently to the feedstock through a passage inside each of the one or more elongate conduits of the first catalytic zone, and simultaneously the partly-cooled combustion products stream flows counter-currently to the feedstock outside of each of the one or more elongate conduits of the first catalytic zone.

A suitable temperature difference between the feedstock (partially reformed gas) and the reformed gas stream at the outlet end of each elongate conduit in the first catalytic zone is 300° C. or less, especially 250° C. or less, e.g. from 20 to 300° C. and preferably in the range of from 50 to 250° C., such as from 100 to 300° C. or from 150 to 250° C.

For example, at the outlet end of the first catalytic zone the reformed gas stream may be at a temperature of from 900 to 1000° C., e.g. about 950° C. and the feedstock (partially reformed gas) may be at a temperature of from 700 to 800° C., e.g. about 750° C.

A suitable temperature difference between the feedstock and the reformed gas stream at the inlet end of each elongate conduit in the first catalytic zone is 200° C. or less, especially 150° C. or less, and preferably from 50 to 150° C.

For example, at the inlet end of the first catalytic zone the reformed gas stream may be at a temperature of from 450 to 500° C., e.g. about 475° C. and the feedstock may be at a temperature of from 350 to 400° C., e.g. about 375° C.

It will be appreciated that as the feedstock passes along the conduit it will react and therefore partially reformed gas will form. However, for clarity, when referring to temperature difference the fluid inside the conduit that is receiving heat from the reformed gas stream is referenced as "feedstock", even though in practice this will become partially reformed gas as it travels along the conduit from the inlet to the outlet.

In order that reforming and overall process thermal efficiency is maximised, the exit temperature of the partially reformed gas from the first catalytic zone should be as high as practicable. This therefore necessitates a high temperature for the reformed gas stream, to provide sufficient heat and temperature difference to transfer to the feedstock in the first catalytic zone.

The partially reformed gas temperature is suitably 650° C. or more, such as 700° C. or more or 750° C. or more, e.g. from 650 to 900° C. or from 700 to 800° C., in order to maximise the amount of reforming that occurs in the process of the invention.

In order to achieve this, the reformed gas stream as produced in the second catalytic zone is suitably at a temperature of 800° C. or more, or 850° C. or more, such as 900° C. or more, or 950° C. or more, e.g. from 800° C. to 1100° C. or from 850 to 1100° C., or from 900 to 1000° C.

It is desirable for the reformed gas stream to be cooled before it exits the apparatus, to maximise efficiency and also to reduce or avoid metal dusting issues downstream of the apparatus. It will be understood that the heat transfer to the feedstock in the first catalytic zone permits this aim to be achieved.

In one embodiment, the reformed gas stream is at a temperature of 550° C. or less when it exits the apparatus, such as 500° C. or less or 475° C. or less or 450° C. or less, e.g. from 300 to 500° C. or from 350 to 475° C. or from 400 to 450° C.

The use of the counter-current flow arrangement between the feedstock and the reformed gas stream as described above is required to achieve the desired heat exchange.

The use of a relatively low feedstock inlet temperature in the first catalytic zone provides a suitably cooled reformed gas stream whilst minimising heat transfer area.

It is preferred that the feedstock is at a temperature of 500° C. or less when it enters the first catalytic zone, such as 450° C. or less or 400° C. or less, e.g. from 250 to 450° C. or from 300 to 400° C.

In one embodiment, the invention makes use of a counter-current flow arrangement between the feedstock and the reformed gas stream, and the feedstock is at a temperature of 500° C. or less when it enters the first catalytic zone, such as 450° C. or less or 400° C. or less, e.g. from 250 to 450° C. or from 300 to 400° C.

As noted above, in one embodiment in the first catalytic zone the reformed gas stream is heated by indirect heat exchange with the partly-cooled combustion products stream, which flows co-currently and external to the reformed gas stream, and at the same time the feedstock in the first catalytic zone is heated by indirect heat exchange with the reformed gas stream. Therefore heat passes from the partly-cooled combustion products stream to the reformed gas stream, and heat passes from the reformed gas stream to the feedstock in the first catalytic zone.

A benefit of this arrangement is that only one catalyst containment wall and heat transfer surface in contact with the catalyst in the first catalytic zone is required.

In this arrangement, reformed gas flows up the annuli between the inner and outer elongate conduit (process tube) walls. In order to maximise the heat transfer coefficients of the reformed gas at the inner wall, and thus minimise the heat transfer area, the gap between the two walls (the hydraulic radius) of the annuli is minimised as far as practicable within reformed gas pressure drop constraints.

Preferably fins or other suitable devices may be attached to, or formed on, the outside surface of the first catalytic zone elongate conduit to further increase the associated heat transfer rate from the reformed gas to the feedstock/partly reformed process gas in the first catalytic zone.

Likewise fins or other suitable devices may be attached to the inside and/or outside of the outer process tube to increase local heat transfer rates.

When there are multiple elongate conduits, in one embodiment the invention uses a "header and lateral" system, as known in the art, for collection and exit of each cooled reformed gas stream. Thus the cooled reformed gas streams (as obtained after they have each heated a given first catalytic zone elongate conduit) are collected in a number of collector tubes (laterals) which then feed into larger tubes or pipes (headers) before exiting the apparatus housing via one or more outlets (e.g. 1, 2 or 4 outlets). Therefore the cooled reformed gas stream outlets run to a location outside the apparatus housing via the "header and lateral" system.

In another embodiment where there are multiple elongate conduits the invention uses a plenum system, as known in the art, for collection and exit of the cooled reformed gas stream. Thus the cooled reformed gas from all the conduits exits the apparatus housing only after the individual cooled reformed gas streams have been merged to form a single combined cooled reformed gas stream. In other words, the cooled reformed gas stream outlets from all of the elongate conduits merge into a single chamber or plenum located inside the apparatus housing. The cooled reformed gas stream then exits the single chamber or plenum, and leaves the apparatus housing, via one or more outlets (e.g. 1, 2 or 4 outlets).

When considering the combustion products, in one embodiment where there are multiple elongate conduits—and therefore where there are multiple further-cooled combustion products streams—it may be that the invention uses a configuration whereby these further-cooled combustion products streams surrounding each conduit combine within the housing, towards the top, before then exiting the housing via a single outlet. Therefore the further-cooled combustion products streams all run to a location outside the apparatus housing via an arrangement that allows these streams to combine within the apparatus, before then exiting through one outlet.

Meanwhile, in yet another embodiment where there are multiple elongate conduits the invention uses a plenum system, as known in the art, for collection and exit of the further-cooled combustion products stream. Thus the further-cooled combustion products stream from all the conduits exits the apparatus housing only after the individual further-cooled combustion products streams have been merged to form a single combined further-cooled combustion products stream. In other words, the further-cooled combustion products stream outlets from all of the elongate conduits merge into a single chamber or plenum located inside the apparatus housing. The further-cooled combustion products stream then exits the single chamber or plenum, and leaves the apparatus housing, via one or more outlets (e.g. 1, 2 or 4 outlets).

Heat Transfer in the Second Catalytic Zone

In the second catalytic zone the partially reformed gas is converted into a reformed gas stream. This requires the provision of heat to the partially reformed gas as it passes over catalyst in an elongate conduit in the second catalytic zone.

As discussed above, heat is transferred to the second catalytic zone from the exothermic combustion region. Heat is supplied from the exothermic combustion region to the second catalytic zone by transfer of heat from both (i) the combustion itself and (ii) the hot combustion products stream, both convectively and by gas radiation.

The exothermic combustion region is adjacent to and laterally surrounds the second catalytic zone. As discussed in more detail above, it is preferred that each elongate conduit in the second catalytic zone is provided with heat from two or more burner nozzles, more preferably from three or more burner nozzles or four or more burner nozzles. These burner nozzles may be adjacent to and laterally surround the elongate conduit to which they provide heat.

It is preferred that the second catalytic zone is arranged such that combustion products flow externally and co-currently to the partially reformed gas flowing through the elongate conduit(s) in the second catalytic zone. This can be achieved by positioning the outlets of the burner nozzles outside the elongate conduit(s) in the second catalytic zone and towards the partially reformed gas inlet end(s) thereof, and arranging them such that the combustion products are directed towards the reformed gas outlet end(s) of the elongate conduit(s).

During fuel combustion, and immediately thereafter, the high temperatures of the partially combusted and resulting combustion gases leads to very high heat flux to the adjacent elongate conduit(s) of the second catalytic zone. If a counter-current flow arrangement were used, the point of peak flux would be adjacent to the peak reformed gas temperature. This would result in extremely high tube wall temperatures. This would make the arrangement much less practical and cost-effective. The use of a co-current arrangement is therefore preferred, because it ensures that the peak flux occurs at a location where the temperature of the reformed gas is significantly lower than the peak temperature of the reformed gas stream, and this peak temperature occurs at a location where the heat flux from combustion products is significantly lower. Therefore relatively low tube wall temperatures are experienced, providing for lower design tube wall temperatures requiring lower grade construction materials and/or lower tube wall thicknesses than would otherwise be required, leading to reduced costs.

In one embodiment, the invention optionally makes use of radiative inserts as described elsewhere in relation to the first catalytic zone. These can improve the heat transfer to the elongate conduits in the second catalytic zone in the area adjacent to the first catalytic zone. Suitably the radiative inserts located adjacent to the second catalytic zone may be continuations of the radiative inserts located in the first catalytic zone.

Thus in the downstream end of the second catalytic zone the heat transfer rate from combustion products to partially reformed gas can be increased, thus minimising the required heat transfer area and tube length.

Radiative Inserts

In one embodiment, the invention optionally makes use of radiative inserts. These can improve the heat transfer to the elongate conduits in the first catalytic zone.

A radiative insert can be made from any material that has the ability to adequately radiate heat. It may be that the insert is completely made of such material or the insert may be coated or otherwise treated with such material.

In one embodiment the radiative insert is formed from, or coated with, ceramic material. Other treatments to increase surface emissivity are well known.

The radiative inserts are located in, and suitably pass continuously through, the heat recovery region. They are therefore arranged relative to the elongate conduits in the first catalytic zone.

The heat transfer from the partly cooled combustion products stream to the first catalytic zone can be enhanced by the use of these radiative inserts.

The radiative inserts may suitably be provided between the elongate conduits located in the first catalytic zone. The inserts may be provided in a regular pattern or an irregular pattern. It is not essential that an insert is provided in each space between two elongate conduits, but when inserts are present they should be provided such that they are symmetrically arranged around each elongate conduit.

The radiative inserts serve two functions.

Firstly, by blocking a large proportion of the area within which combustion products can flow, the velocity—and thus the convective heat transfer coefficient—of the combustion products and heat transfer rate to the elongate conduit(s) is greatly increased.

Secondly, heat from the combustion products is transferred convectively to the radiative inserts, and it is then transferred onwards to the elongate conduit(s) by surface-to-surface radiation. Therefore the heat transferred to the first catalytic zone and the reformed gas stream therein is maximised.

The inserts may be any suitable size and shape. In one embodiment they are elongate bodies. They may have any suitable cross sectional shape, e.g. circular, triangular, or square. The gaps between the inserts and the elongate conduits may be varied both circumferentially and longitudinally. In one embodiment the inserts may have a tapered end.

Fins may be provided on the surface of the radiative inserts, to aid heat transfer and mixing of flowing gases.

The gap between the radiative inserts or enclosure and the outer elongate conduit may be suitably tapered to provide a varying heat transfer rate at different elevations, thereby to maximise the local heat transfer rate whilst not exceeding elongate conduit (outer process tube) wall design temperatures.

Spacers are usefully provided, to maintain separation distances between each radiative insert and outer process tube.

The radiative inserts may suitably extend partly into the combustion region, and therefore they may be arranged relative to the elongate tubes in the second catalytic zone.

However, the radiative inserts should not extend to reach the location of the burner nozzles. The distance they extend into the combustion region is limited by (a) the lack of need for them (the local heat flux is high enough anyway) and (b) the temperatures become too high and therefore the mechanical limits of the radiative inserts would be exceeded.

In another embodiment, the invention optionally makes use of inert tubes which enclose each of the elongate conduit(s).

Pressurised Combustion

The invention may be operated at any suitable combustion pressure that facilitates flow of combustion gases through the apparatus via the designated flow-paths. If operated at or near atmospheric pressure at the combustion products outlet, for an economic design a combustion air pressure of up to 1 barg or more may be required. The invention may be operated at higher pressures, however, which may confer significant advantages to both the apparatus and the associated reforming flowsheet.

In particular, the invention provides the option to operate at such a pressure as may provide a differential pressure across the wall of the elongate conduit(s) in the second catalytic zone, that is either zero or only slightly negative or positive. Having a minimal or zero pressure difference between the process side, where the reforming reaction occurs, and the combustion side where the heat is generated to support the reformation reaction, is a significant technical benefit.

In this regard, by operating with the differential pressure that is substantially zero, the conduit wall thickness that is required to prevent rupture during the design life can be reduced. The wall thickness can be kept to the minimum required for structural stability, corrosion and any other design considerations, rather than needing to allow additional thickness to cope with the pressures experienced during the process. This is in particular of relevance when considering the walls of the elongate conduit at the location of the peak temperature ("hot spot") during operation.

Advantageously, radial creep can be eliminated entirely at this "hot spot" point, and almost entirely elsewhere along the length of the elongate conduit. This provides the ability to utilise thin walls and/or material for the walls that is less robust/has poorer mechanical properties than might otherwise be the case when operating the combustion zone at or near atmospheric pressure.

Apart from cost and weight reduction, a further significant benefit of using thinner tube walls for the outer conduit is that the process gas flow paths for both the second catalytic zone and the first catalytic zone have greater cross-sectional areas for a given process mass flowrate, resulting in lower pressure drop through the zones, or permitting smaller catalyst particle sizes and corresponding increased heat transfer rates to the process gases. Increased heat transfer rates reduce both metal wall temperatures and required surface areas, both of which are beneficial.

It will be appreciated that the pressure of the combustion-sustaining medium as provided to the combustion region can be controlled, and as a consequence the pressure differential can be controlled to be zero or close to zero.

In one embodiment, the pressure of the combustion-sustaining medium is controlled such that the differential pressure between the second catalytic zone and the exothermic combustion region is less than 500 kPa or less than 250 kPa, such as less than 100 kPa, or less than 50 kPa, e.g. less than 20 kPa or less than 10 kPa.

In one preferred embodiment, the combustion-sustaining medium is at a pressure of 1,000 kPa to 8,000 kPa or more and the reformed gas inside the elongate conduit(s) in the second catalytic zone is at a pressure of 1,000 kPa to 8,000 kPa or more, and the difference in pressure therebetween is 500 kPa or less, such as 100 kPa or less or 50 kPa or less, or 10 kPa or less.

In particular, this low difference in pressure is highly relevant at the location of the peak wall temperature ("hot spot") during operation.

In an alternative embodiment, the pressure of the combustion-sustaining medium can be selected so as to be optimal in terms of the design of the elongate conduits versus the power required to compress the combustion-sustaining medium to achieve the pressure.

The use of a higher pressure for the combustion-sustaining medium and consequent pressure differential reduction allows design and operation of the reformed gas stream at a higher peak temperature than would otherwise be the case with the same tube wall material and wall thickness. A higher temperature can have the benefit of increasing the hydrocarbon conversion in the reforming process. A high peak reformed gas temperature also maximises the temperature of the partially reformed gas as formed in the first catalytic zone and thus maximises the proportion of the reforming achieved in the first catalytic zone. This means that the proportion of the reforming achieved by using waste heat is maximised, which is clearly beneficial. It thus increases the overall thermal efficiency of the process.

Reformed gas temperatures in excess of 950° C. are therefore possible, with associated higher thermal efficiencies. However, this must be weighed up against the fact that the increased design temperatures could lead to higher specification materials being required for the elongate conduit(s) in the second catalytic zone and a part of the first catalytic zone It can be appreciated by the skilled reader that the optimum temperature for the reformed gas will be based on overall economic considerations.

Catalysts

Catalysts for steam ($H_2O$) reforming of hydrocarbons and for dry ($CO_2$) reforming of hydrocarbons are known. It is within the ability of the skilled reader to select a catalyst system for the first catalytic zone and a catalyst system for the second catalytic zone in order to achieve reforming of the hydrocarbon feed.

The catalyst system for the first catalytic zone and a catalyst system for the second catalytic zone may be the same or different. A catalyst system may comprise a single catalyst type or more than one catalyst type.

Catalysts will normally be provided in the form of a catalyst bed. Therefore the first catalytic zone will have a first catalyst bed in each elongate conduit, and the second catalytic zone will have a second catalyst bed in each elongate conduit.

The catalyst volume required for the reforming process, for a given process flow-rate, is determined typically by the heat transfer surface area of the elongate conduit (reformer process tube), though which all heat for heating the process gases and the endothermic heat of the reforming reactions must pass. Other considerations are the residence time/space velocity of the gas within the catalyst, the type, size, shape and effective surface area of the catalyst and its composition, such as nickel content. All of these factors can be considered by the skilled reader to achieve the degree of feedstock conversion required.

The type, size and shape of the catalyst each also have an impact on the heat transfer, both at the walls of the elongate conduit(s) and laterally across the catalyst bed itself. The size is, in particular, highly relevant. Heat transfer at the walls of the elongate conduit(s) impacts the tube wall temperature. Heat transfer laterally across the catalyst bed itself impacts the overall effectiveness of the catalyst bed (i.e. the approach to equilibrium of the exiting reformed gas).

As discussed above, in a preferred embodiment, the temperature of the feedstock as provided to the inlet of the elongate conduit(s) in the first catalytic zone is relatively low.

In the catalyst bed in the first catalytic zone, the prevailing temperatures are benign in terms of metal wall design, except near the bed exit. A high wall surface internal heat transfer coefficient is therefore not necessary to minimize metal design temperatures.

As the skilled reader will be aware, carrying out reforming at relatively low temperatures requires the use of highly active catalyst with large surface area. These catalysts are known and typically used in pre-reforming catalyst beds. Suitable catalysts include those with high nickel content, for example.

Traditional pre-reforming particulate catalysts, which are suitable for use in at least part of the first catalytic zone, also tend to have small characteristic dimensions, such as a diameter of from 3 to 6 mm. This characteristic dimension or particulate size also provides for sufficiently high heat transfer coefficients at the walls of the elongate conduits, thus minimizing the required conduit length. It can be appreciated that such catalysts would therefore be appropriate for use in the first catalytic zone, particularly near the inlet.

Towards the outlet of the first catalytic zone, it may be more appropriate to utilise catalyst of a larger size, with lower activity, to minimize pressure drop through the bed. Therefore the characteristic dimension for the catalyst may, for example be a diameter of 5 mm or more or 6 mm or more, such as from 5 to 9 mm, preferably from e.g. 6 to 8 mm. In general, the catalyst size should not be so large as so as to not properly fill the containment conduit (process tube). For example, for spheres, a low D/d ratio (where D is the internal tube diameter and d is the sphere diameter) may give rise to excessive gas flow rates at the walls, or other flow maldistribution in the bed.

The use of monolithic or structured catalysts may, in particular, be appropriate for use in the first catalytic zone. These may be used in part, together with other catalysts, or may be the sole catalyst type.

The selection of optimum catalyst(s) in the first catalytic zone is a compromise between catalyst size/shape, surface area, activity, heat transfer and pressure drop. The skilled reader will be able to select a suitable catalyst type taking into account those available and the factors to be balanced and optimised.

In order to maintain activity and ensure a long catalyst life it is necessary to eliminate the likelihood of catalyst degradation over time by, for example, carbon/gum build-up or deactivation with sulphur compounds or other poisons, particularly at the catalyst bed inlet. This could be achieved by installation of a pre-reforming catalyst bed, within the elongate conduit(s) upstream of the first catalyst bed. Alternatively, and more practically, this may be provided externally to the first catalytic zone within, or external to, the apparatus. If external to the apparatus, catalyst change-out would be straightforward and could be carried out with the apparatus online, during normal operation, if necessary. Removal of trace amounts of sulphur in a pre-reforming catalyst bed will then maintain activity within the first catalyst bed at low temperatures for an extended period.

In the second catalytic zone the selection criteria are different. Here the catalyst will be well reduced, with a high hydrogen content in the gas from reforming in the first catalytic zone, and the reaction rate will be high due to the high operating temperatures. The most important criterion for catalyst selection here is to ensure that the heat transfer coefficient at the wall of the elongate conduit(s) is high enough throughout to limit wall temperatures to be within reasonable design limits and that the allowable pressure drop is not exceeded. A second criterion is to ensure sufficient catalyst activity to accommodate the high local heat flux at the bed inlet. In general, the catalyst characteristic dimension(s) in the second catalytic zone will be smaller than that used in the first catalytic zone, such as <6 mm, preferably 3-5.5 mm, more preferably 3.5-5 mm, in order to provide the necessary high heat transfer coefficients at the elongate conduit wall, with acceptable gas distribution across the flow path.

If desired, a different size or shape of catalyst can be utilised at different locations within the second catalyst bed, but this is not essential.

The catalyst volumes required in the present invention can be somewhat lower than is typical for known steam reforming operations. The space velocities used in the present invention are relatively typical for the required catalyst sizes and gas compositions.

Traditionally, steam reforming catalysts have been formed from catalytically active components such as nickel deposited on carrier materials such as ceramic carrier materials, often manufactured as pellets, and often formed as shaped short cylinders with holes to provide extended surface areas. Pelletized or particulate catalysts are known as "random packing" catalysts or random catalysts. The advantage of random packing catalysts are that they generally fill the reformer tubes consistently over the entire heated tube length, particularly at the tube walls; this is important so as to maintain high turbulence and high heat transfer in order to maintain the tube wall temperatures within design limits. This is also useful as typical reformer tubes are subject to radial "creep" over their life-time, whereby the tubes can grow in diameter by several percent. Random packing catalysts accommodate this by settling and maintaining tube wall contact.

The disadvantage of random packing catalysts are the fact that they are not subject to the same degree of thermal expansion/contraction during heating/cooling cycles as the containing reformer tubes. Thus during tube heating (at start-up) the tube will expand, the catalyst tending to drop as it fills the additional volume created. Upon tube cooling (at shut-down) the catalyst pellets are subject to crushing forces, with breakage occurring at weaker points such as corners. Thus the catalyst is subject to degradation over time, often manifested by increased pressure drop through the catalyst bed.

A particular potential issue is where pelletized catalyst is contained within an annulus, whereby the internal and external tube walls expand and contract by different amounts. This can cause serious distortion and potential overstressing of the tubes as the system cools and the catalyst is compressed and tends to "grip" the tube walls, preventing free movement of the walls one to another.

More recently developed structured (packing) catalysts are typically manufactured from either ceramic monoliths or metallic foil consisting of blocks of the catalyst substrate to which the catalyst is applied, in which regular flow paths are formed.

The advantage of structured catalysts are that high activities can be achieved (via high surface area) with low pressure drops. The structured catalyst should be subject to less physical degradation over time, and should maintain the same vertical dimension throughout its life.

One disadvantage is that since the lateral dimensions are fixed, the gap between the catalyst blocks and the tube wall will increase over time as the tube "creeps" outwards. This can reduce the local gas velocity and heat transfer coefficient, thereby reducing cooling of the tube wall The structured catalyst needs to take this into account in the overall design, since tube wall temperature control is of paramount importance.

A second disadvantage is the practical/economic limitation in maximum operating temperature, particularly for metallic substrates.

The skilled reader will be able to weigh up the advantages and disadvantages and choose a suitable catalyst or combination of catalysts.

In one embodiment the catalyst used in the present invention is selected from structured catalysts, random packing catalysts, and combinations thereof.

In one embodiment, the present invention may use a combination of one or more structured catalyst in the colder section of the elongate conduit in combination with one or more random packing catalyst in the hotter section of the elongate conduit. This has the benefit of balancing and optimising practical and economic considerations.

In general, various combinations of different reforming catalyst may be used in the first and second catalyst beds. The catalysts used may differ in terms of composition, such as nickel content or inclusion of promoters, and/or may differ in terms of particle shape and/or size. Selections may be made to optimize catalyst activity and heat transfer characteristics.

Steam reforming catalysts may be utilised in an up-flow or down-flow orientation. Where necessary, catalyst loading may conveniently be from the underside (the bottom of the elongate conduit).

In one embodiment, within each elongate conduit there may be a continuous catalyst bed. In an alternative embodiment, there may be discrete sections of catalyst provided within each elongate conduit in the first catalytic zone. These may suitably be interspersed by inert blocks or shapes which act to direct flow in an annulus adjacent to the walls so as to achieve high heat transfer. Thus there would be a series of separate heating and reaction steps, instead of a continuous catalyst bed inside the elongate tubes. A benefit of this arrangement is that the total amount of catalyst required can be reduced.

Combustion Sustaining Medium

The combustion sustaining medium may suitably be combustion air.

However, an alternative to the use of combustion air is a mixture of oxygen and $CO_2$. For example, a useful embodiment may use recycled $CO_2$ (e.g. obtained from the combustion products) and oxygen. This may be beneficial in terms of energy reduction when producing hydrogen with $CO_2$ capture, for example.

Process Operating Parameters

Steam/Carbon Ratio

The invention may be carried out using a range of steam/carbon (S/C) ratios in the feedstock. In general, the process of the current invention can be undertaken at any S/C ratio as known in the art. The skilled person will appreciate that this can be selected depending on end-use. A typical S/C ratio will be in the range from 1.5 to 3.0, or more.

In one embodiment the S/C ratio may be in the range of from 1.5 to 2.5, such as from 2.0 to 2.5.

The use of higher S/C ratios generally results in lower overall process efficiencies. S/C ratios of 1.5 or less are possible, depending on catalyst configuration, operating conditions and feedstock composition. Operation at too low a S/C ratio under prevailing process conditions can give rise to carbon deposition on the reforming catalyst and/or process tube walls, leading to catalyst damage and blocking of tubes $CO_2$ may be used to replace some or all of the steam in the reforming reaction. Addition of $CO_2$ is beneficial for situations where high $CO:H_2$ ratios are required in the end product. Addition of $CO_2$ may increase overall process efficiency by reducing the necessary steam rate. This would apply to production of, for example, Fischer Tropsch synthesis products and methanol.

For the production of hydrogen, $CO_2$ addition is not beneficial, but lower S/C ratios do result in higher process efficiencies Process Operating Pressure The invention may be operated at any pressure that produces reformed gas at the desired product pressure at the exit, for example from 200 to 8,000 kPa or more.

In general, lower steam reforming operating pressures increase the amount of reforming, whilst increasing costs, both in the reforming plant itself and in reformed gas compression downstream. The optimum operating pressure is thus a balance between operating and capital costs, and will vary from case to case.

It can be seen that the process of the current invention is suitable for operation at relatively high pressures, as increasing pressure reduces proportionally the gas velocity and apparatus differential pressure.

Elongate Conduits

Size and Shape of Elongate Conduits

Elongate conduits are used in both the first catalytic zone and the second catalytic zone. In each case, the conduit contains catalyst, as discussed above.

The following discussion of size and shape for the elongate conduits applies to both the conduits used in the first catalytic zone and the conduits used in the second catalytic zone. The conduits for the two zones can be selected independently, so they do not need to have the same size and/or the same shape.

In one embodiment, elongate tubes with circular cross section are preferred as the shape for the elongate conduits, although other shapes may be used.

Preferred diameters for the conduits are relatively small compared to conventional steam reformer tubes, for example the diameter of the elongate conduits may be in the range of from 25 to 150 mm, e.g. from 25 to 100 mm, preferably from 50 to 100 mm, e.g. 40 to 80 mm. However, tubes of other diameters could also be used.

A small diameter tube requires a thinner wall than a larger diameter tube for operating at the same temperature and differential pressure, and hence is less costly. Smaller tubes in greater numbers also provide relatively more heat transfer surface area for a given overall throughput.

However, smaller tubes require more tubes to obtain the same throughput and a corresponding increase in cost. Also, small diameters may cause catalyst packing problems leading to poor heat transfer. A smaller number of larger diameter tubes may provide relatively lower heat transfer surface area for a given total throughput.

Therefore the skilled person can select a desired tube diameter taking such factors into account.

Arrangement of Elongate Conduits

One or more elongate conduits are used in both the first catalytic zone and the second catalytic zone.

Where more than one elongate conduit is used, the arrangement of the conduits relative to one another is preferably in a regular pattern or array.

In a preferred embodiment, the conduits are arranged in a pitch of triangular or square orientation.

Where multiple elongate conduits are utilised in a regular array, the tube pitch, i.e. the distance from the centreline of each elongate conduit assembly to the next, is determined principally by consideration of the heat transfer to the second catalytic zone from combustion products and their precursors in the combustion region.

In general, minimizing the tube pitch, and thereby minimising the gap between adjacent tubes, results in higher overall throughput for a given containment vessel diameter and hence lower costs.

It will be appreciated that the closer the elongate conduits are arranged together, the closer the ratio of pitch to outer tube diameter gets to 1.

In a conventional radiant steam reformer the principal (radiant) mode of heat transfer is facilitated by relatively large mean beam lengths between tubes and the enclosure. In the current invention heat transfer is both convective and radiative, the latter particularly in the initial combustion area near the burner nozzles where temperatures are highest.

By reducing the tube pitch and thus the distance between tubes, the mean beam length of the radiating molecules will be reduced, thus reducing the amount of heat transferred to the process tubes (elongate conduits). However, the same reduction in tube pitch for a given tube diameter will result in a smaller cross-sectional area available for combustion products flow. Combustion product gas velocities will thus be increased, thereby increasing the convective heat transfer coefficients and heat transferred to the process tubes.

Accordingly the method and rate of heat transfer can be varied by design by adjusting the tube pitch.

Additionally, in one embodiment the outer process tube diameter (and necessarily the inner tube diameter) is varied over the tube length so as to optimize the mix of convective and radiative heat input.

Practical mechanical considerations may also influence tube pitch. For example, support of the assemblies may require a fixed space between the outside of each assembly, or feed distribution conduits or reformed gas product stream collector conduits may require such spacing.

In the current invention a ratio of pitch to outer tube diameter of 2.0 or less may be used, such as 1.8 or less or 1.6 or less. Preferably a ratio of pitch to outer tube diameter of 1.5 or less is used, more preferably 1.3 or less.

In the present invention it is not necessary to have any thermal insulation on the walls that separate process streams. Therefore in one embodiment there is no thermal insulation on the walls that separate process streams.

Materials of Construction

The elongate conduits (process tubes) may be made fabricated from suitable commonly used steels of appropriate specifications, which are well known in steam reforming service.

In general, the apparatus of the current invention may use materials typical of traditional steam reformers. In the high temperature region the preferred metal alloys would have high temperature strength (resistance to creep and creep rupture) and high resistance to both oxidation and process gas corrosion.

In areas of lower temperatures appropriate lower grade materials can be used, such as austenitic stainless steels, for example grade 347H.

In the apparatus of the current invention, advantageously each elongate conduit may be made from more than one alloy, and may be of the same or different wall thickness along its length. These differences can take account of different temperatures and pressures along the length of the conduit.

The highest design temperatures occur in the outer elongate conduit especially in, and adjacent to, the exothermic combustion region. In operation, the peak wall temperature is preferably adjacent to the peak reformed gas temperature, although the apparatus may be designed with a peak wall temperature nearer to, or near, the burner nozzles.

Among the alloys suitable for typical steam reforming applications are various nickel-based alloys, containing various amounts of nickel, chromium with modifiers such as tungsten or niobium. Centrifugally spun-cast tubes are generally preferred.

In the apparatus of the current invention, the use of relatively small diameter elongate conduits means that it is desirable to minimize wall thickness as much as practicable, so as to maximise the gas flow path and therefore the reformed gas flow rate through each tube.

Operation according to the preferred embodiment utilising high pressure combustion minimizes the differential pressure across the tube wall and the resulting design wall thickness required. Accordingly, thinner wall thickness wrought tubes of appropriate specification can be utilized, such as Haynes Alloy 230™. This reduces overall costs through both reduced tube costs and the maximizing of reformed gas production per tube (assembly).

Fuel Gas Distribution

Fuel gas may be supplied to each burner nozzle via at least a plurality of conduits in flow communication with a fuel gas inlet and located upstream of (below) the exothermic combustion region.

In another embodiment the fuel gas inlet may supply fuel to a fuel distribution plenum located upstream of the exothermic combustion region. The fuel distribution plenum in turns communicates with the inlet ends of a plurality of nozzle tubes (burner nozzles) that extend upwards from the upper tube sheet of the plenum. The use of a plenum is preferred for larger vessels.

Preferably each burner nozzle has associated therewith a flow restriction device, such as an orifice, which functions to make fuel flow rates more uniform from nozzle to nozzle.

The outlet tip of each burner nozzles may be any suitable shape, such as round (circular), straight or circular slots, or otherwise shaped and may be open-ended or contain other devices to control fuel and combustion sustaining medium mixing direction and length.

Combustion Sustaining Medium Distribution

The combustion sustaining medium distribution system is designed to introduce air or other combustion sustaining medium into the exothermic combustion region at the upstream end thereof in such a manner to provide a substantially uniform velocity profile across the flow path.

The detailed design of the distribution system will depend on apparatus capacity, i.e. the number of elongate conduit assemblies and thus the containment vessel diameter. Devices for the distribution of gases in vessels are well known, and may comprise such as baffles, deflectors, plates with holes, tubes and the like. Any known devices may be used, alone or in combination.

In one embodiment, where a plenum is utilised for distribution of fuel gas, air distribution tubes may be used. In this regard, multiple tubes in parallel may be provided in a regular array. Each tube may pass through the plenum from the bottom tube sheet of the plenum to the top tube sheet of the plenum. Each tube may be sized to provide substantially the same air flowrate therethrough.

Each air distribution tube and the plenum tube sheets may be suitably provided with thermal insulation to prevent overheating of the fuel gas contained therein.

Optionally each air distribution tube may have associated therewith a flow restriction device, such as an orifice, which functions to make air flowrates more uniform from tube to tube.

Metal Dusting

Metal dusting is a severe form of corrosive degradation of metals and alloys at high temperatures (300-850° C.) in carbon-supersaturated gaseous environments.

The skilled person will be aware of metal dusting and that coatings can be used to prevent metal dusting. Such coatings are well known in the art. Aluminium diffusion coating is a specific example. Further treatment of the aluminium diffusion-coated surface is also possible, to further enhance the protection. For example, phosphating is known as an example of a further treatment.

Suitable coatings and treatments may therefore be used in the present invention to prevent/reduce metal dusting.

As reformed gas cools from its peak temperature against the surrounding walls in the annulus between the first elongate conduit and the outer process tube the tube walls will reach a temperature, depending on the reformed gas composition, where the onset of metal dusting corrosion can occur. As temperatures further decrease, the likelihood and extent of metal dusting tends to fall. The locations of the start of the possible metal dusting region will be different for the inner and outer walls of the annuli.

Both the inner and outer walls may be provided with suitable coatings/treatments to prevent metal dusting. Fins or other attachments in the annulus within the zone of possible metal dusting may be similarly treated.

The relatively low temperature of the reformed gas exiting the annuli ensures that metal dusting issues should not occur downstream of the apparatus.

Other Optional Features of the Invention

Further improvements and options regarding the process and apparatus described herein are:

The use of a hydrogen membrane within the elongate conduit(s) to facilitate hydrogen removal and increase the overall hydrogen production within the apparatus.

The use of a water-gas shift catalyst zone within the elongate conduit(s) to increase the overall hydrogen production within the apparatus.

The use of additional heat transfer enhancement means, which may be convective and/or radiative, within and external to the elongate conduit(s). These include, but are not limited to, the provision of fins, surface treatments, devices to increase fluid velocities and/or fluid flow tortuosity.

The use of additional external connections to the elongate conduit(s) to, for example, facilitate addition of steam or purging of the second reforming catalyst without passing through the first catalyst bed.

DETAILED DESCRIPTION OF THE INVENTION WITH REFERENCE TO THE DRAWINGS

Figure 1:
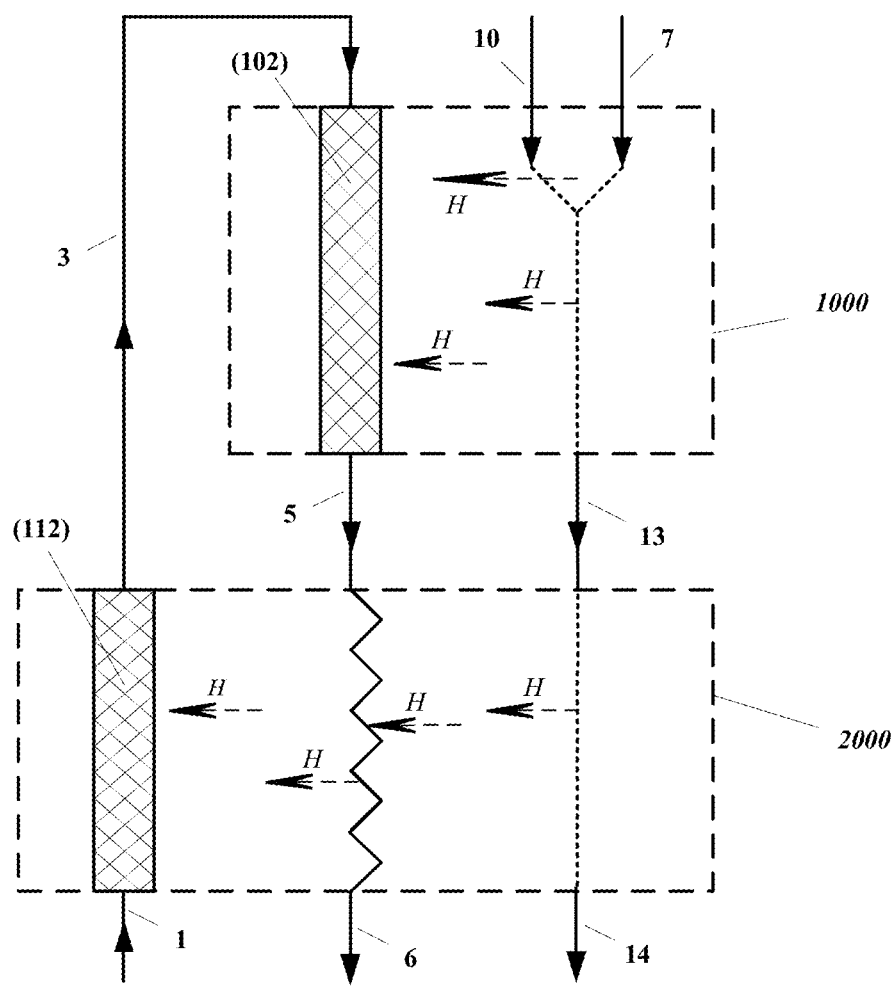
FIG. 1 is a diagram that illustrates the process streams and heat flows in the present invention.

The process and apparatus of the invention can be understood by reference to the non-limiting embodiments shown in FIGS. 1 to 7.

The apparatus can be operated inverted from the orientation as indicated in the drawings.

The invention is described in the context of steam reforming, but it will be appreciated that this can be readily modified for use in dry reforming, with some or all of the steam being replaced with $CO_2$.

The entire process as described can be undertaken in a single enclosure or housing (104) containing a single elongate reforming assembly or multiple elongate reforming assemblies (100) arranged in parallel. For simplicity this description relates to multiple elongate reforming assemblies (also known as process tubes) (100).

The elongate reforming assemblies (100) each comprise an outer process tube which forms the second catalytic zone elongate conduit (101) and a first catalytic zone elongate conduit (114).

Figure 3A:
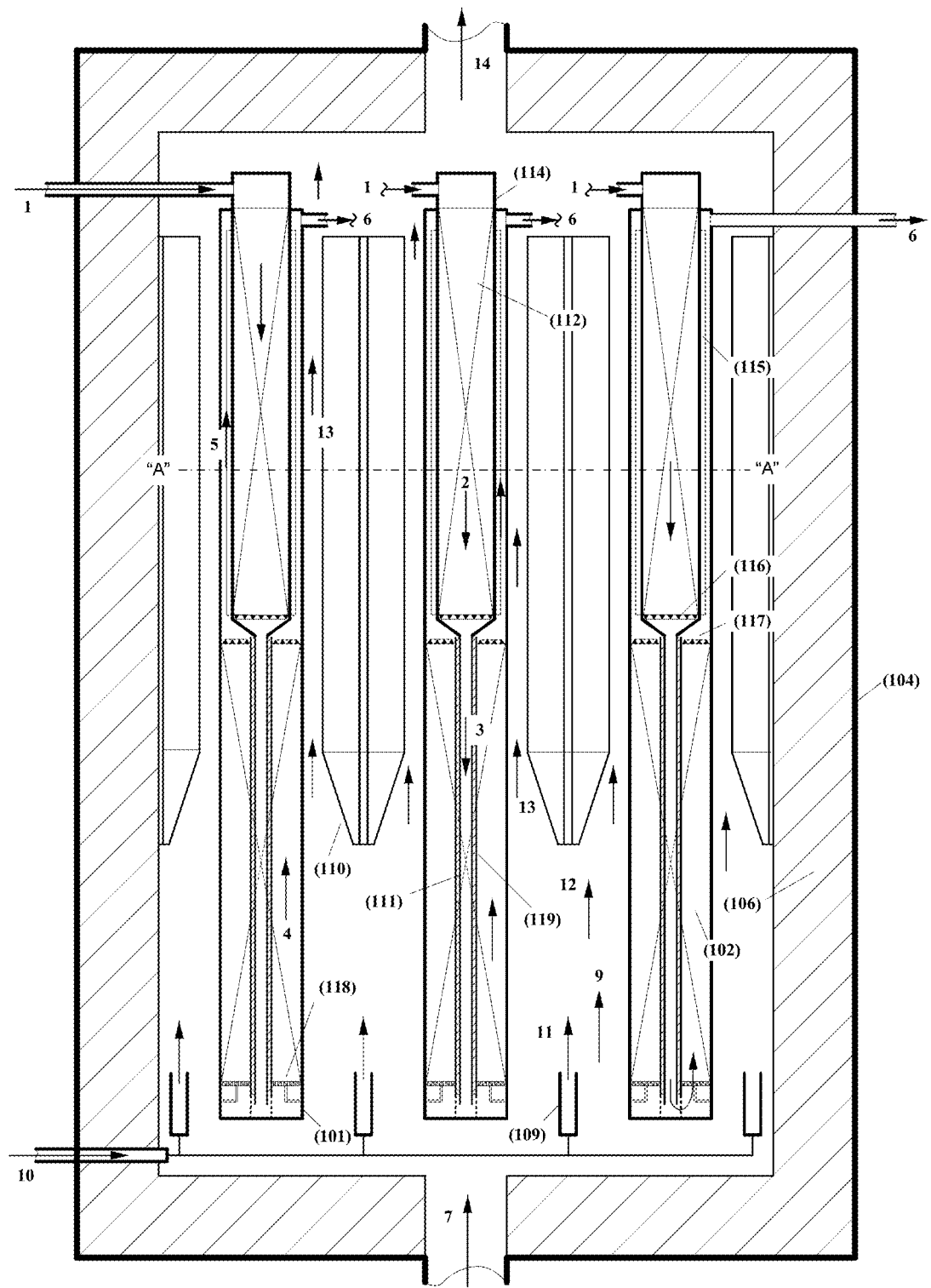
FIG. 3A shows a first configuration of apparatus according to the present invention.

In the embodiment shown in FIG. 3A, each second catalytic zone elongate conduit (101) contains and is attached to a first catalytic zone elongate conduit (114) such that these two conduits (101, 114) are in longitudinal alignment.

In this embodiment shown in FIG. 3A, each first catalytic zone elongate conduit (114) receives feedstock (1) via a separate feedstock inlet. This may suitably be via a header and lateral system.

In this embodiment shown in FIG. 3A, each hot reformed gas stream (5) loses heat to a first catalytic zone elongate conduit (114) and the resulting separate cooled reformed gas product streams (6) are then collected together (e.g. in a header and lateral system) to form a combined cooled reformed gas product stream. This single cooled reformed gas product stream then exits the apparatus via one or more outlets.

In this embodiment shown in FIG. 3A, each combustion products stream (13) loses heat to a first catalytic zone elongate conduit (114) and the resulting further-cooled combustion products streams (14) then combine within the housing, towards the top, before exiting the housing via a single outlet.

The apparatus shown in FIG. 3A can be understood to include a process tube assembly according to the third aspect of the invention. The process tube assembly comprises an inner tube (114) and an outer tube (101) in a concentric arrangement, wherein the inner tube (114) contains a first reforming catalyst portion, with a first reforming catalyst bed, wherein the outer tube (101) contains a second reforming catalyst portion, with a second reforming catalyst bed, whereby the first reforming catalyst bed and the second reforming catalyst bed are arranged in series, whereby the inner tube (114) has an exit through which partially reformed gas can leave the inner tube (114), and whereby an internal conduit (111), through which partially reformed gas can flow, runs from the exit of the inner tube (114) and passes through the second reforming catalyst portion.

Figure 3B:
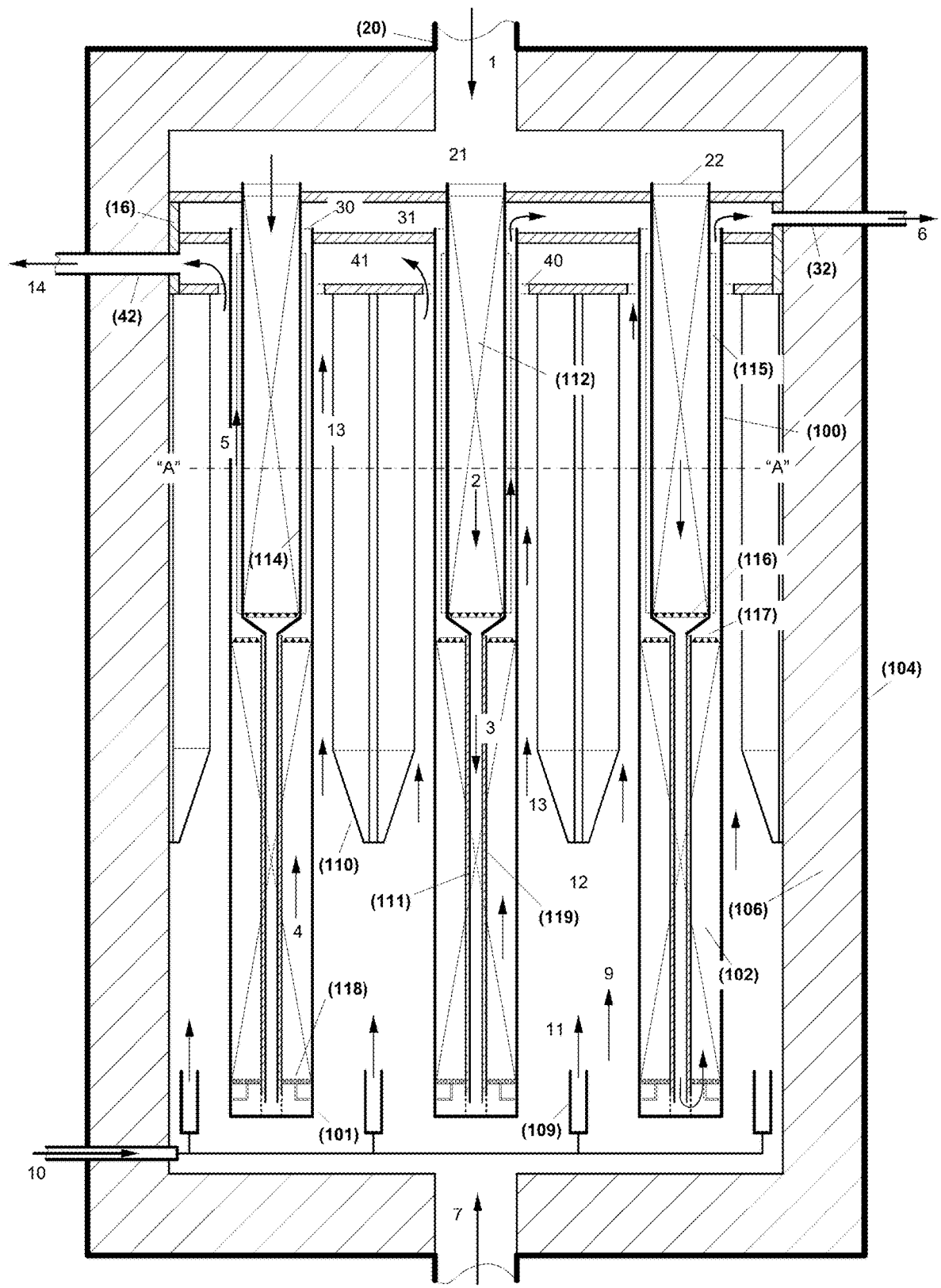
FIG. 3B shows a second configuration of apparatus according to the present invention.
Figure 4:
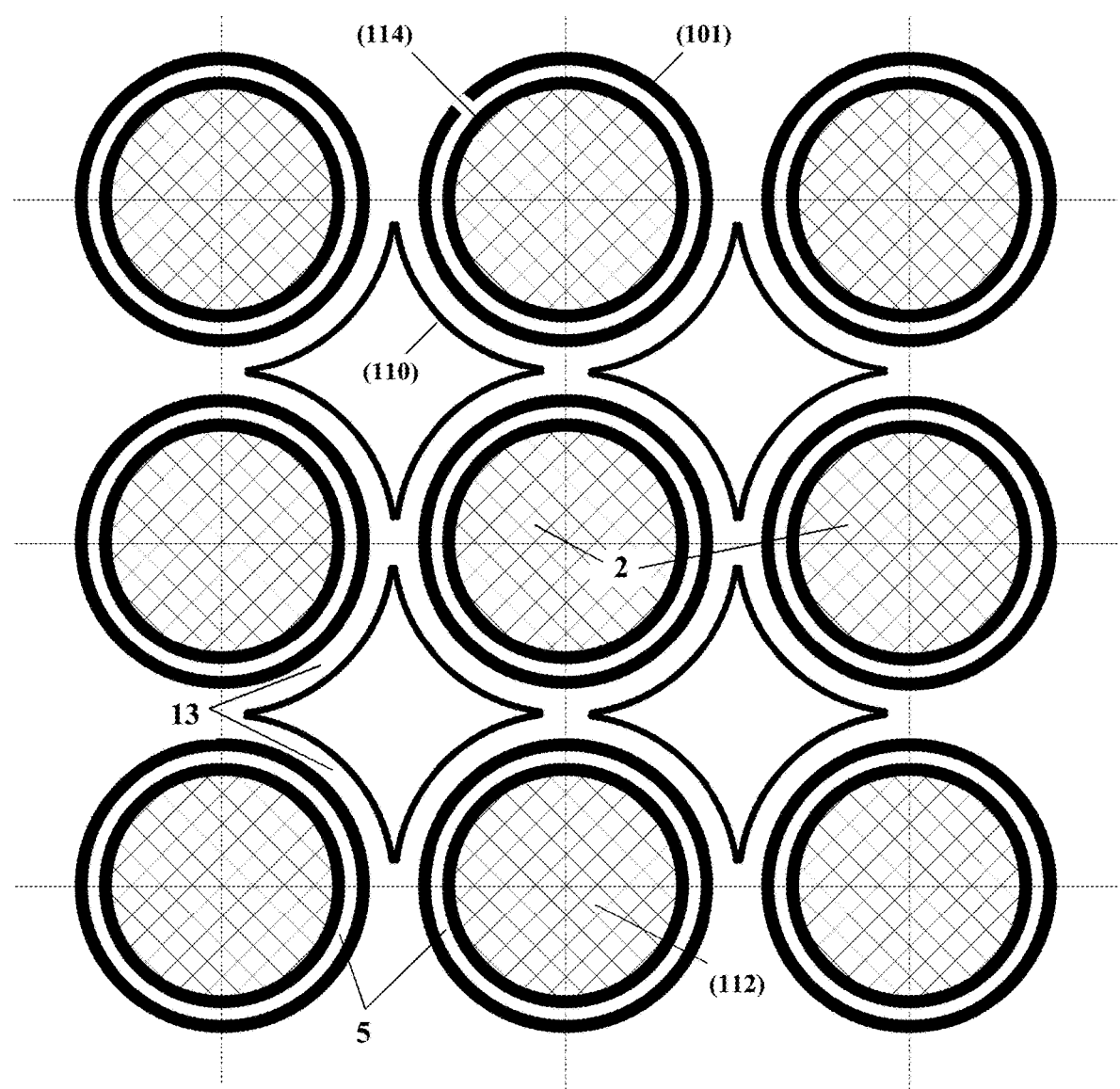
FIG. 4 is a partial cross section of the apparatus shown in FIGS. 3A and B, taken across the line "A"-"A". This provides a part cross-sectional view of the heat recovery section of the apparatus.

In the embodiment shown in FIG. 3B, each second catalytic zone elongate conduit (101) contains a first catalytic zone elongate conduit (114) and these two conduits (101, 114) are in longitudinal alignment. The location of the first catalytic zone elongate conduit (114) is fixed at a single location, where the first catalytic zone elongate conduit (114) is held in place by plenum unit (16). The location of the second catalytic zone elongate conduit (101) is likewise fixed at a single location, where the second catalytic zone elongate conduit (101) is held in place by plenum unit (16). Thus the second catalytic zone elongate conduit (101) and the first catalytic zone elongate conduit (114) can be considered as being indirectly attached, at just one single location, via the plenum unit.

The apparatus shown in FIG. 3B can be understood to include a process tube assembly according to the third aspect of the invention. The process tube assembly comprises an inner tube (114) and an outer tube (101) in a concentric arrangement, wherein the inner tube (114) contains a first reforming catalyst portion, with a first reforming catalyst bed, wherein the outer tube (101) contains a second reforming catalyst portion, with a second reforming catalyst bed, whereby the first reforming catalyst bed and the second reforming catalyst bed are arranged in series, whereby the inner tube (114) has an exit through which partially reformed gas can leave the inner tube (114), and whereby an internal conduit (111), through which partially reformed gas can flow, runs from the exit of the inner tube (114) and passes through the second reforming catalyst portion.

In the embodiment shown in FIG. 3B the plenum unit (16) comprises a cooled reformed gas plenum. The cooled reformed gas plenum has multiple inlets (30), each being an inlet for a cooled reformed gas stream that is obtained after it has heated a given first catalytic zone elongate conduit (114). The multiple inlets (30) merge into a single chamber (31) located inside the apparatus housing. This chamber or plenum has one or more outlet (32) for the combined cooled reformed gas stream (6); the or each outlet runs to a location outside the apparatus housing.

In this embodiment shown in FIG. 3B the plenum unit (16) also comprises a further-cooled combustion products stream plenum. The further-cooled combustion products stream plenum has multiple inlets (40), each being an inlet for a further-cooled combustion products stream that is obtained after it has heated a given first catalytic zone elongate conduit (114). The multiple inlets (40) merge into a single chamber (41) located inside the apparatus housing. This chamber or plenum has one or more outlet (42) for the combined further-cooled combustion products stream (14); the or each outlet runs to a location outside the apparatus housing.

It can be seen that in the embodiment shown in FIG. 3B the plenum unit (16) also serves the purpose of holding in place the top of each of the first catalytic zone elongate conduits (114) and the top of each of the second catalytic zone elongate conduits (101). Therefore their position relative to one another is secured, indirectly.

In this embodiment shown in FIG. 3B, the apparatus comprises a single combined feedstock inlet (20) which runs from outside the apparatus housing to a chamber (21) inside the apparatus housing to provide feedstock (1). The chamber (21) then has multiple outlets (22), each being a feedstock inlet for one of the first catalytic zone elongate conduits (114).

In all embodiments of the invention, de-sulphurised natural gas (or any other source of hydrocarbon) and steam can provide a feedstock (1) at a temperature in the region of 300-500° C. This is introduced to the top of the first catalytic zone elongate conduits (process tubes) (114). The feedstock (1) then flows downwards as stream (2) through first reforming catalytic zones (112), each comprising a first reforming catalyst bed. In the first reforming catalytic zones some of the contained methane and essentially all higher hydrocarbons are converted to hydrogen and carbon oxides. Therefore a partly reformed process gas (3) is formed. The first reforming catalyst beds in the first reforming catalytic zones (112) may be composed of more than one catalyst type.

Second reforming catalytic zones (102) are provided in each second catalytic zone elongate conduit (101). The second catalytic zones (102) each comprise a second reforming catalyst bed.

Partly reformed process gas stream (3) is routed through these second catalytic zones (102) via transfer conduits (111).

Then the partly reformed process gas stream (4) flows up through second catalytic zones (102).

Further reforming and methane conversion takes place in the second catalytic zones to produce hydrogen and carbon oxides. This gas stream exits the catalyst beds at a temperature typically between 750° C. and 1100° C., preferably between 900 and 1000° C. Thus a hot reformed gas stream (5) is formed.

Heat for the endothermic reforming reaction in the first reforming catalytic zones (112) and for further heating of the feedstock and partly reformed process gas (3), up to a temperature in the region of 650-800° C., is provided by counter-current cooling of the hot reformed gas stream (5).

Figure 2A:
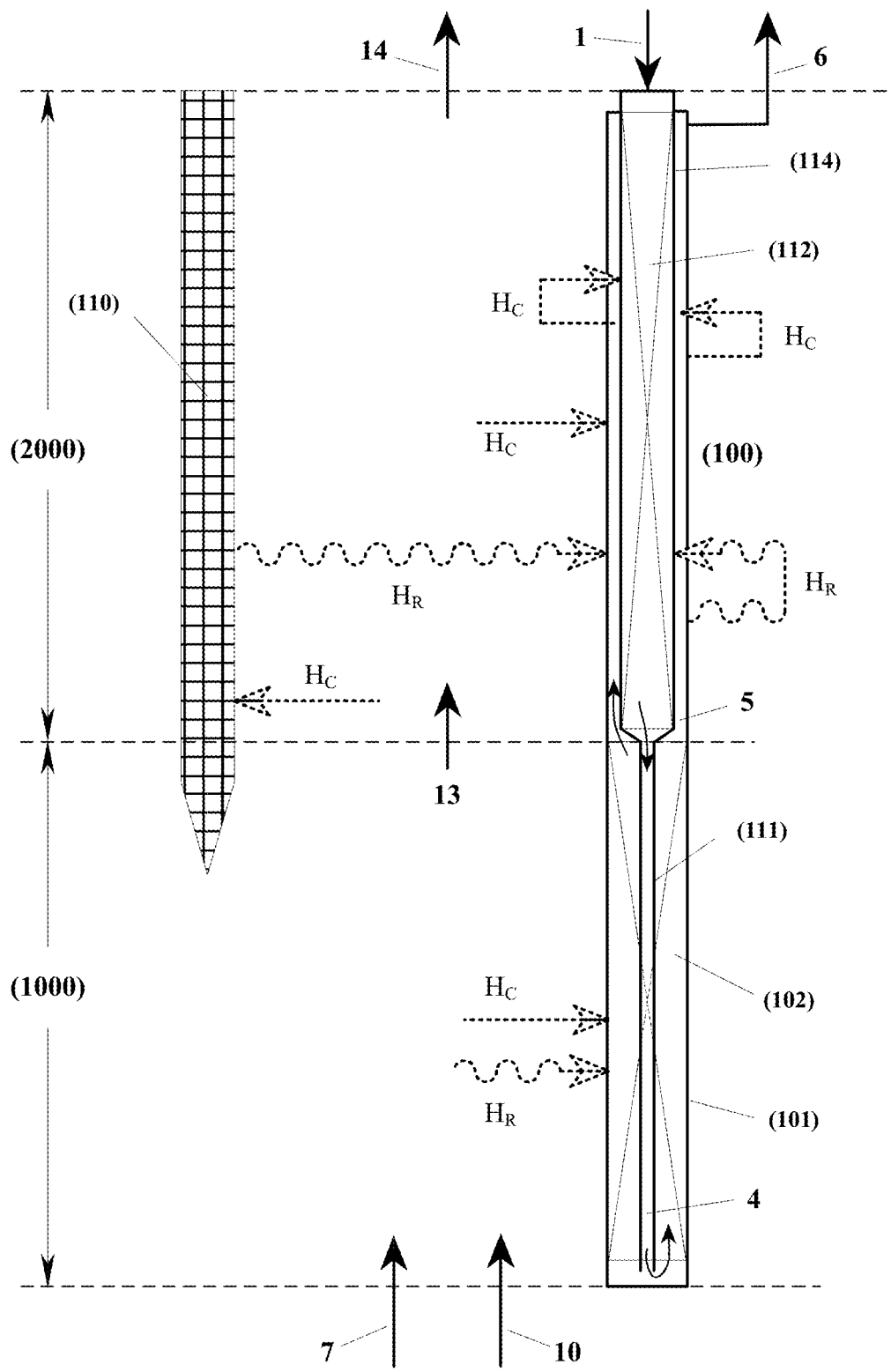
FIG. 2A is a schematic illustration of a first apparatus according to the present invention.

In the arrangement shown in FIG. 2A, the hot reformed gas stream (5) flows in an annulus between the first catalytic zone elongate conduit (114) and the outer process tube (101). There is also simultaneous heating of the hot reformed gas stream (5) by the combustion products stream (13) flowing outside of the outer process tube (101).

Figure 2B:
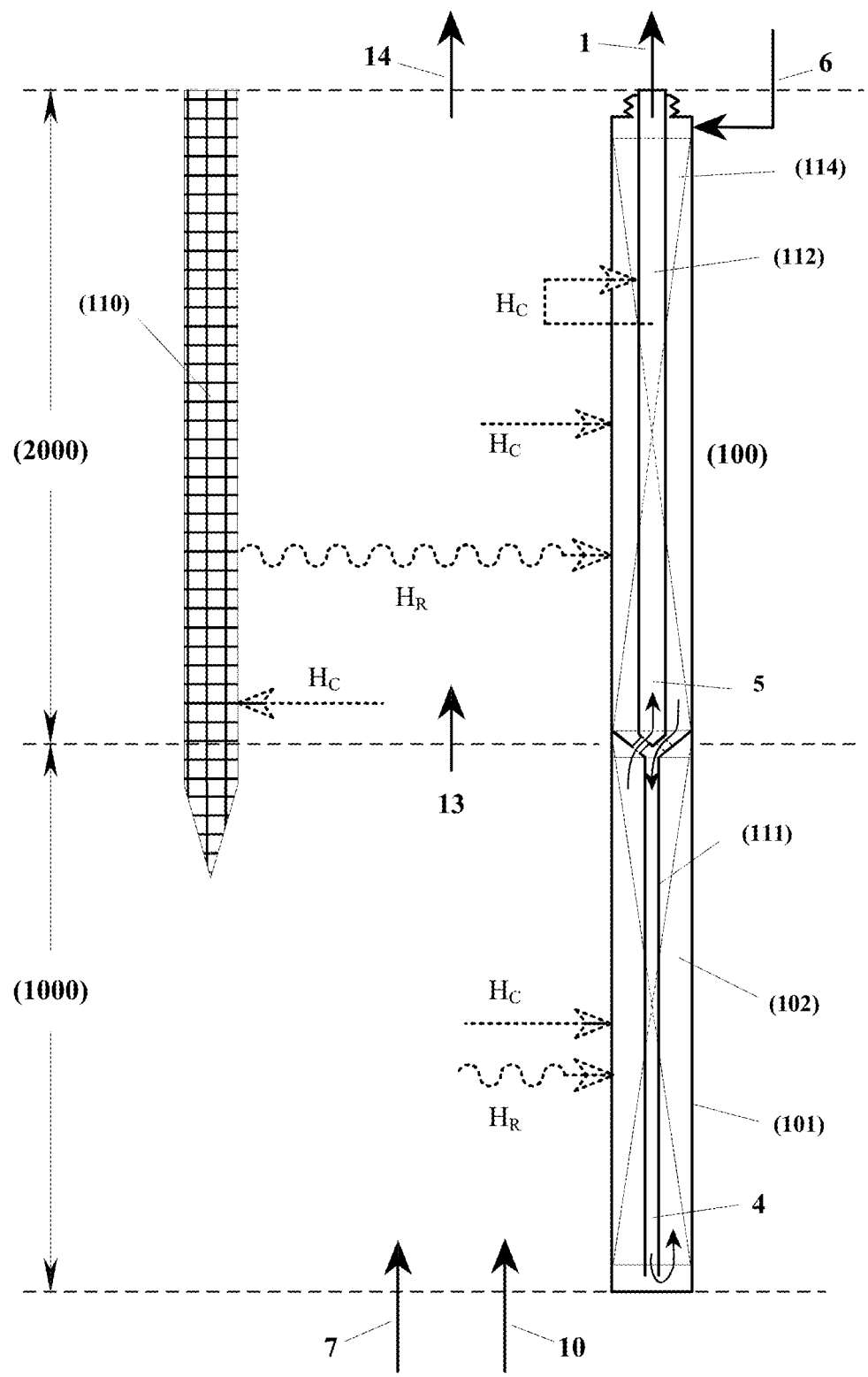
FIG. 2B is a schematic illustration of a second apparatus according to the present invention.

In the arrangement shown in FIG. 2B, the hot reformed gas stream (5) flows in a passage inside the elongate conduit (114) of the first catalytic zone (112). There is also simultaneous heating of the first catalytic zone (112) by the combustion products stream (13) flowing outside of the outer process tube (101).

Fins or other devices (115) may be attached to the outside surface of the elongate conduit (114) of the first catalytic zone (112) to increase the associated heat transfer rate from the reformed gas to the feedstock/partly reformed process gas (2).

Likewise fins or other suitable devices (not shown) may be attached to the inside and/or outside of the outer process tube (101) adjacent to the first catalytic zone to increase local heat transfer rates.

Suitable spacers are usefully provided to maintain separation distances between each first catalytic zone elongate conduit (114) and each outer process tube (101).

To prevent significant heating of partly reformed process gas stream (3) inside the transfer conduits (111), suitable heat insulating material may be applied inside or outside for a part or all of their lengths.

In a preferred embodiment, free movement of the transfer conduits (111) occurs vertically, during start-ups or shut-downs, when there are differential temperatures and degrees of expansion of the outer process tube (101) relative to the inner conduit (114) and transfer conduit (111). This is achieved by provision of an outer tube (119) in contact with the catalyst in second reforming catalytic zone (102). The transfer conduit (111) is able to slide vertically relative to this outer tube (119), thus allowing also free movement of the inner conduit (114) relative to the outer process tube (101). The outer tube (119) is configured to permit this movement. For example, the outer tube (119) may be formed of discreet parts, may be a shape other than cylindrical, or may be corrugated.

The internal surfaces of the transfer conduits (111) may be plated or coated with a surface of suitable reforming catalyst or the conduit may be provided with catalytic inserts to aid in the overall reforming process.

To provide support and restraint of catalysts within the catalytic zones, appropriate support or restraint devices (116, 117, 118) are provided. A first device (116) is below the first catalytic zone, a second device (117) is above the second catalytic zone and a third device (118) is below the second catalytic zone.

The catalyst support device (116) permits free flow of partially reformed gas to conduit (111) whilst preventing loss of catalyst from the first catalytic zone above.

The restraining device (117) prevents upward flow of catalyst with the reformed gas to the annulus above between (114) and (101). This device may usefully be attached to the bottom of conduit (114), thereby to prevent an increased separation between the two. An increased separation would result in lower local gas velocities at the outer tube wall (101), with correspondingly lower local heat transfer coefficients leading to higher local tube wall temperatures.

The support device (118) is provided to prevent the catalyst from passing through in a reverse direction when gas flow is low, whilst allowing upward flow of partially reformed gas therethrough. It is designed so as to move upwards in operation so as to support the bottom catalyst and prevent catalyst particulate fluidisation within the second catalytic zone.

In order to increase the heat flux to the process tubes in the upper part of the combustion zone, radiative inserts (110) or other devices are provided around the process tubes to increase the velocity of the combustion products and to increase the heat transfer rate to the elongate reforming assemblies (process tubes) (100).

In a preferred embodiment, radiative inserts (110) are provided in the heat recovery region (2000) and extend in part into the exothermic combustion region (1000). These inserts are external to the catalytic zones (102) and (112) respectively, and may be formed of constant or varying shapes. These provide inert volume, to increase the gas velocity and local heat transfer coefficients of the partly cooled combustion products stream (13) flowing up and outside of outer process tube (101), as well as to absorb heat convectively with subsequent heat transfer to the process tubes via direct radiation.

The hot reformed gas stream (5) exits second catalytic zone (102), passing up the annulus between tubes (101) and first catalytic zone elongate conduits (114), providing reaction heat for the first catalytic zones. It loses heat as a consequence, and thus becomes cooled reformed gas product stream (6).

The cooled reformed gas product stream (6) is discharged from the top of process tubes (101) and exits the reformer at a temperature of typically 400-500° C., preferably about 475° C. or lower.

In the embodiment shown in FIG. 2A, the hot reformed gas stream (5) flows counter-currently and in indirect heat exchange contact with the feedstock (1), and simultaneously the combustion products stream (13) flows co-currently in indirect heat exchange contact with the hot reformed gas stream (5), such that heat is transferred from the combustion products stream (13) to the reformed gas stream (5), and heat is transferred from the hot reformed gas stream (5) to the feedstock (1).

In the embodiment shown in FIG. 2B, the hot reformed gas stream (5) flows through a passage inside the elongate conduit (114) of the first catalytic zone (112), and provides heat to the feedstock (1) from within the elongate conduit (114), and simultaneously the combustion products stream (13) flows outside the elongate conduit (114) of the first catalytic zone (112) and heat is transferred from the combustion products stream (13) to the feedstock (1).

Heat of reaction for the reforming reaction in the reformer lower section (second catalytic zone) is provided by combustion of an oxidant, such as air, and a fluid fuel.

Externally preheated and pressurised combustion sustaining medium (e.g. air stream) (7) is introduced at or near to the bottom of enclosure or housing (104) at a temperature whereby the combination of combustion air and fuel are above the fuel auto-ignition temperature and combustion can be sustained via turbulent diffusion flame. Typically the combustion air stream (7) will be heated to a minimum temperature of about 600° C. to 750° C., although higher temperatures may be used. Higher temperatures above the auto-ignition temperature tend to be disadvantageous mechanically. Hot combustion air is distributed into the combustion zone, as stream (9). The auto-ignition temperature can be reduced if desired by the use of suitable catalytic combustion devices.

Cold or externally partially preheated fuel gas stream (10) is introduced into the air in the combustion zone via burner nozzles (109) where it is combusted (11) to form combustion products stream (12) which imparts heat both convectively and via gas radiation to the process tubes (101) and thence to process gas stream (4) and second catalytic zones (102).

The internal walls of the enclosure or housing (104) are covered with suitable refractory material (106) to provide protection to the enclosure or housing (104) and to minimise external heat loss.

Figure 5:
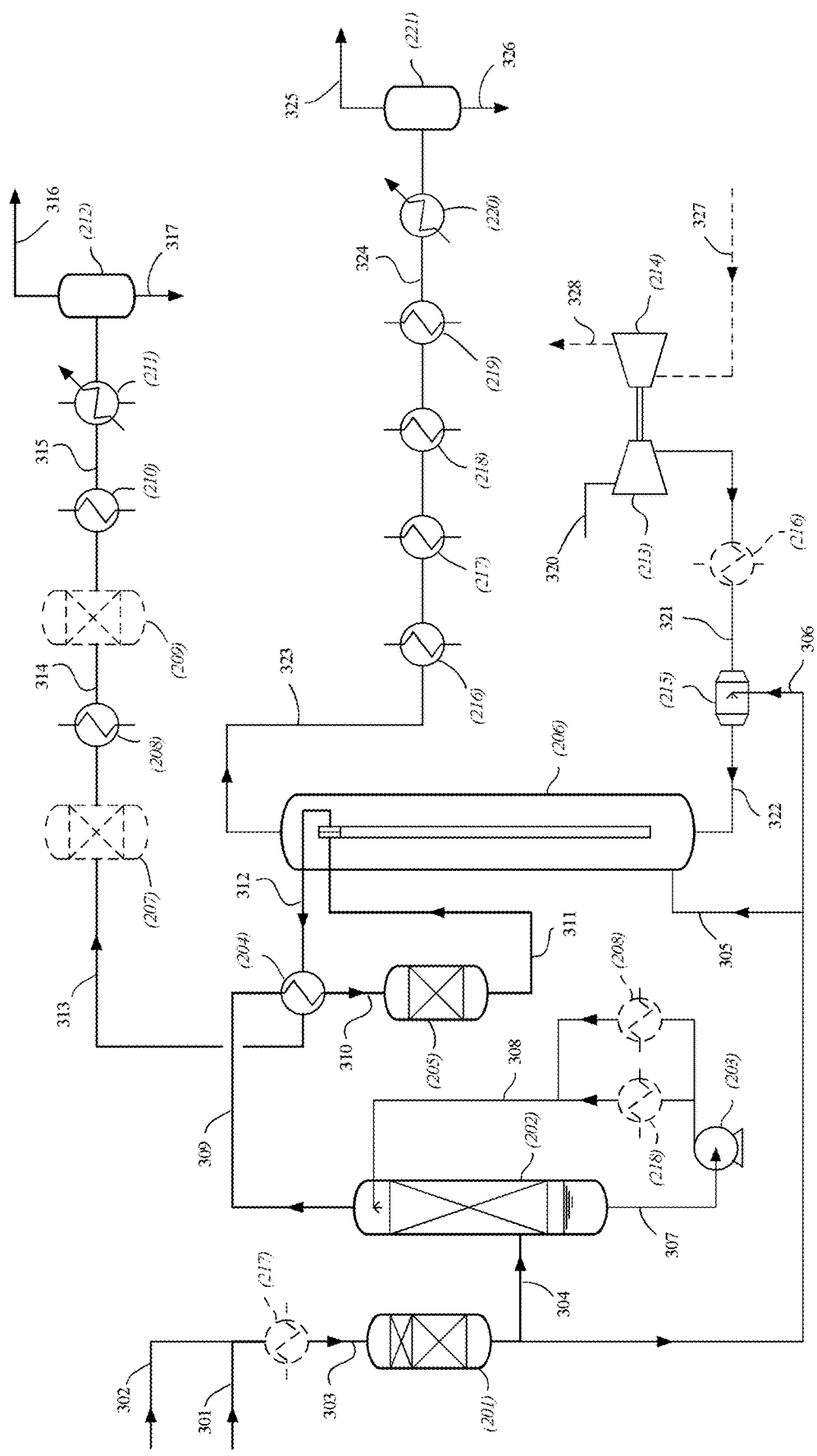
FIG. 5 shows the apparatus according to the invention integrated into a suitable steam reforming system.
Figure 6A:
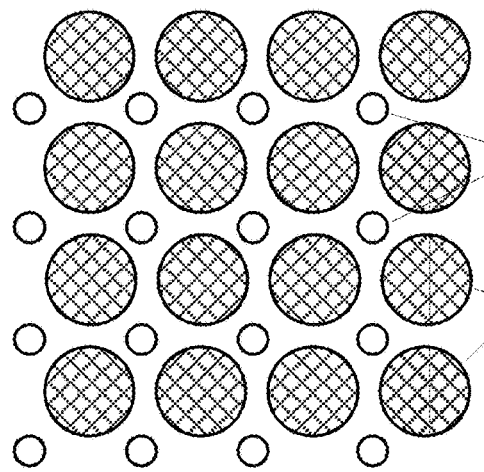
FIG. 6A and FIG. 6B show two possible arrangements of burner nozzles and elongate conduits within an apparatus according to the invention.
Figure 6B:
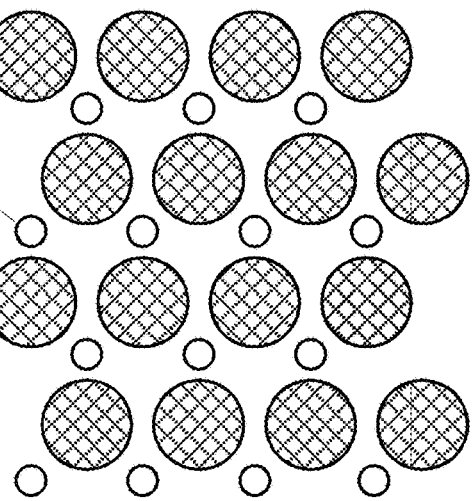

In FIG. 5, the following components of a steam reforming system suitable for use with the current invention are shown:
Equipment Items
201. Desulphurization Vessel
202. Feedstock Saturator
203. Saturator Water Circulation Pump
204. Feedstock/Reformed Gas Heat Interchanger
205. Pre-reformer
206. Double Convective Reformer=apparatus according to the invention
207. High Temperature CO Shift Reactor (optional—for $H_2$ production only)
208. Reformed Gas Saturator Water Heater
209. Low Temperature CO Shift Reactor (optional—for $H_2$ production only)
210. Saturator Water Make-up Heater
211. Reformed Gas Cooler
212. Reformed Gas Separator
213. Combustion Air Compressor
214. Combustion Products Expander
215. Combustion Air Heater
216. Combustion Air Pre-heater
217. Desulphurization Pre-heater
218. Combustion Products Saturator Water Heater
219. Low Grade Heat Recovery Exchanger
220. Combustion Products Cooler
221. Combustion Products Separator
Stream Numbers
301' natural gas feedstock
302 hydrogen recycle
303 pre-heated feedstock to desulphurization unit
304 desulphurised feedstock to saturator
305 desulphurised fuel gas to DCR
306 desulphurised fuel gas to CA heater
307 cooled saturator circulation water
308 hot saturator circulation water
309 saturated feed gas
310 heated pre-reformer feed
311 DCR feed
312 DCR reformed gas product
313 partially cooled reformed gas
314 partially cooled reformed gas
315 partially cooled reformed gas
316 cooled separated reformed gas
317 process condensate
320 atmospheric combustion air
321 compressed pre-heated combustion air
322 heated combustion air to DCR
323 combustion products from DCR
324 partially cooled combustion products
325 cooled separated combustion products
326 steam condensate
327 combustion products to expander
328 combustion products vent to atmosphere FIG. 6 shows two different options for arranging the elongate tubes of the second catalytic zone (101) and the burner nozzles (109). Other arrangements are possible, but these are beneficial arrangement in terms of efficiency and even distribution of heat. In these arrangements a triangular or square arrangement of alternating burner nozzles and elongate tubes is used, and an approximately equal number of burner nozzles and elongate tubes is used. FIG. 6a shows a square arrangement whilst FIG. 6b shows a triangular arrangement. Both arrangements permit each burner nozzle to provide heat to multiple elongate conduits.

Figure 7:
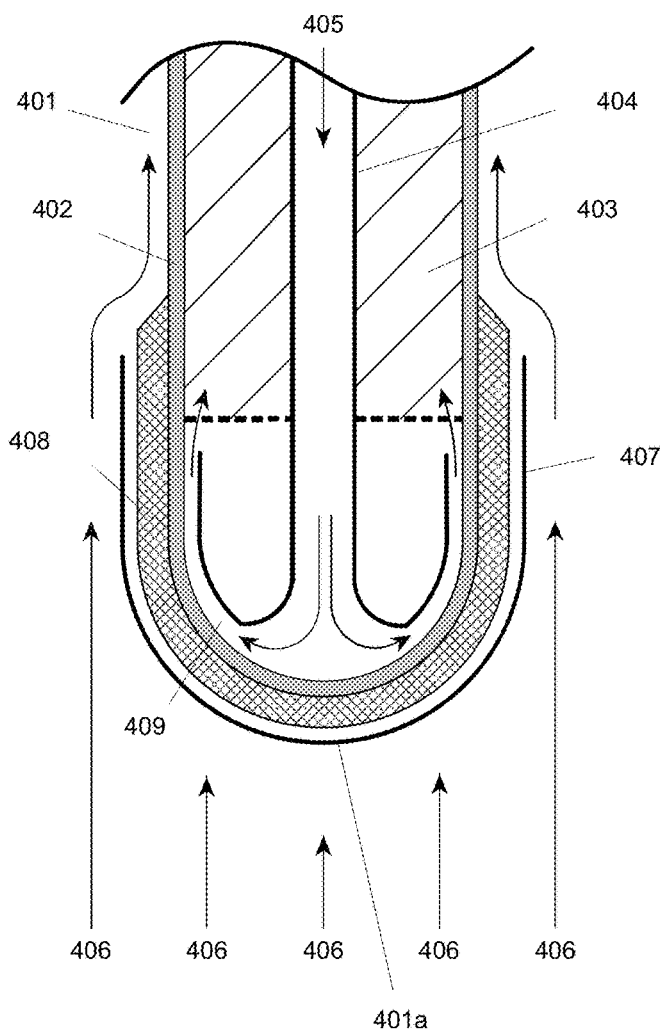
FIG. 7 is a schematic drawing illustrating the use of the process tube assembly of the third aspect of the invention without requiring the burner nozzles/combustion region present in the first and second aspects.
Figure 2B:
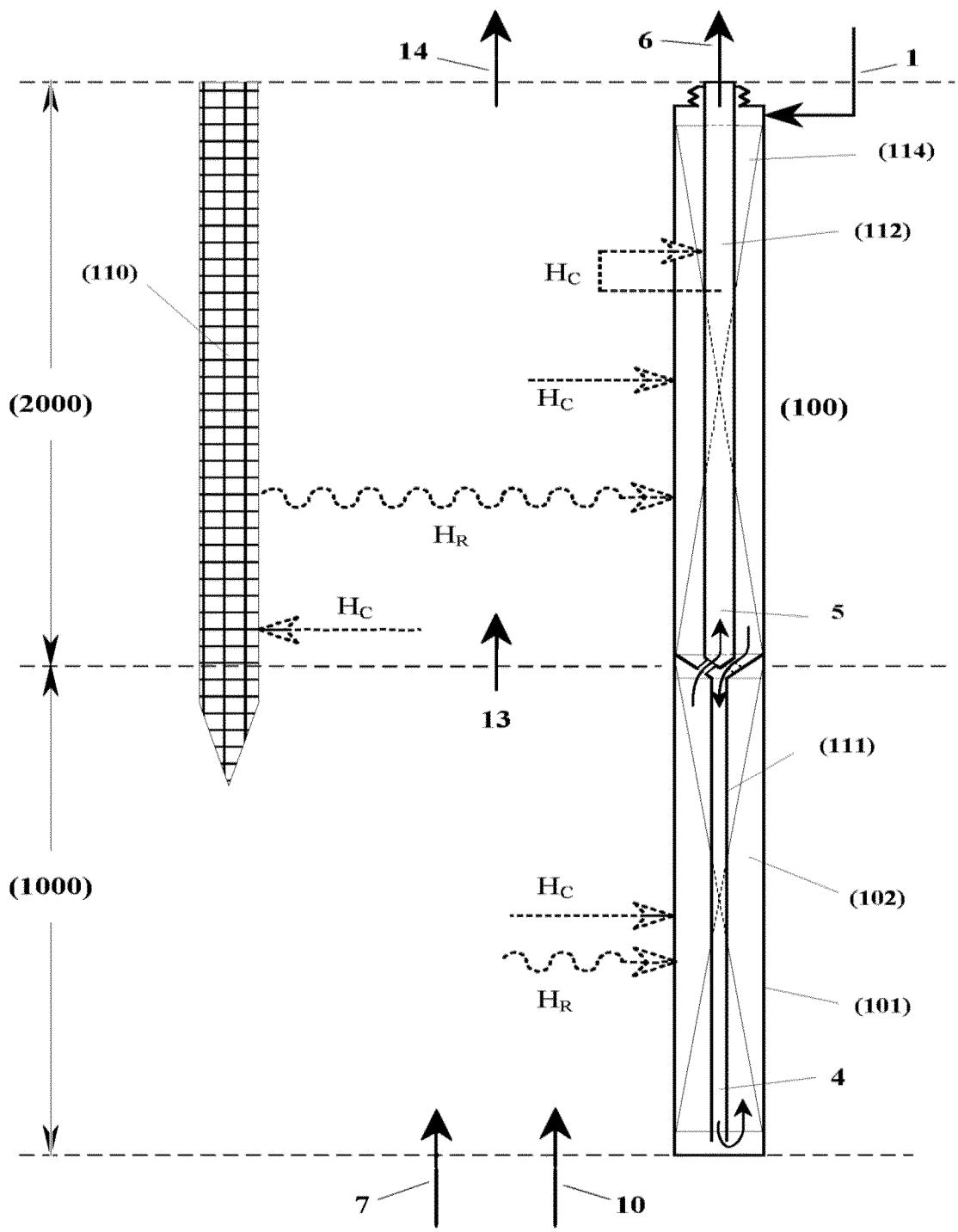

Whilst in a preferred embodiment the process tube assembly of the third aspect is used in the process of the first aspect and is present in the apparatus of the second aspect, the process tube assembly of the third aspect can also be used in other processes and apparatus. FIG. 7 illustrates one such embodiment. FIG. 7 is schematic and only shows part of the process tube assembly but it will be understood that the focus of FIG. 7 is the changes made to utilise the process tube assembly in a different environment, where the hot gas that is required to heat the catalyst in the process tube assembly is produced remotely from (upstream from) the assembly.

The process tube assembly 401 comprises an inner tube and an outer tube 402, provided in a concentric arrangement. The second reforming catalyst bed 403 can be seen within the assembly.

The internal conduit 404, through which partially reformed gas 405 can flow, passes through the second reforming catalyst portion.

The hot combustion products 406 are provided to the assembly, having been produced remotely from (upstream from) the assembly.

The process tube assembly 401 has been adapted by the inclusion of one or more radiant shields 407 and thermal insulation 408 at the end 401a of the process tube assembly 401, to significantly reduce the heat load to the outer tube 402 at this location. It may be that only one out of a radiant shield 407 and thermal insulation 408 is used to achieve this, but in the illustrated embodiment both are present.

Heat must also be removed from the bottom of the outer tube 402 to maintain a suitable maximum wall temperature. For example, the tube assembly 401 may be configured to create a flow path 409 adjacent to the process tube assembly walls, such that process fluids flow in contact with the process tube assembly walls to remove heat from the outer tube 402 near the end 401a of the process tube assembly 401.

An example of the data from a process operating in accordance with the present invention, according to the apparatus as shown in FIG. 3B, is set out in Table 1 below. Per the preferred arrangements described previously, the feedstock is assumed to have passed through an adiabatic pre-reformer immediately upstream of the apparatus, whilst the combustion air has been preheated to above the fuel auto-ignition temperature using additional fuel gas (not shown in Table 1).

The Example is based on a reformed gas pressure exiting the apparatus of 3,410 kPa. This requires a feedstock inlet pressure of 4,110 kPa, indicating a differential pressure of 700 kPa across the apparatus. This relatively high differential pressure results from the need to provide high process gas velocities across relatively small catalyst pellet sizes in order to generate high heat transfer coefficients in the catalyst beds, to ensure adequate reforming, and across the elongate conduit (process tube) walls, in order to minimise tube wall temperatures.

The space velocity of the flowing gas in the Example, based on $Nm^3/hr$ methane in the feed per $m^3$ catalyst, is about $1,400\ hr^{-1}$, which is within but at the higher end of that typical of reforming catalysts, but at the low end of the range typical of pre-reforming type catalyst. Typical pre-reforming catalyst is similar in characteristic dimension (size) to that required in the catalytic zones.

Thus in terms of typical catalyst volume and thus surface area and activity it can be seen that the overall catalyst volume of the apparatus of the current invention is sufficient to achieve the requisite amount of reforming.

TABLE 1

Stream Data

| | Stream No. | | | | | | | |
|---|---|---|---|---|---|---|---|---|
| | 1 | 2 | 5 | 6 | 10 | 7 | 13 | 14 |
| | Feedstock to reformer | Part-reformed gas | Hot reformed gas | Final reformed gas product | Fuel gas to combustion region | Combustion air to combustion region | Hot combustion product | Final combustion product |
| $H_2O$ | 5,425.1 | 4,032.2 | 3,156.3 | 3,156.3 | 0.0 | 379.5 | 1,458.7 | 1,458.7 |
| H | 167.3 | 3,392.1 | 6,262.8 | 6,262.8 | 21.0 | 0.0 | 0.0 | 0.0 |
| CO | 0.2 | 439.4 | 1,558.4 | 1,558.4 | 6.0 | 0.0 | 0.0 | 0.0 |
| $CO_2$ | 159.1 | 635.9 | 514.4 | 514.4 | 22.0 | 134.2 | 705.0 | 705.0 |
| $CH_4$ | 2,226.5 | 1,310.5 | 313.1 | 313.1 | 495.1 | 0.0 | 0.0 | 0.0 |
| $C_2H_6$ | 0.0 | 0.0 | 0.0 | 0.0 | 15.1 | 0.0 | 0.0 | 0.0 |
| $C_3H_8$ | 0.0 | 0.0 | 0.0 | 0.0 | 3.3 | 0.0 | 0.0 | 0.0 |
| $C_4H_{10}$ | 0.0 | 0.0 | 0.0 | 0.0 | 1.9 | 0.0 | 0.0 | 0.0 |
| $N_2$ | 125.2 | 125.2 | 125.2 | 125.2 | 30.0 | 5,107.1 | 5,137.1 | 5,137.1 |
| A | 0.0 | 0.0 | 0.0 | 0.0 | 0.0 | 60.7 | 60.7 | 60.7 |
| $O_2$ | 0.0 | 0.0 | 0.0 | 0.0 | 0.0 | 1,122.3 | 37.0 | 37.0 |
| kg mol/hr | 8,103.5 | 9,935.4 | 11,930.3 | 11,930.3 | 594.4 | 6,803.9 | 7,398.5 | 7,398.5 |
| kg/hr | 144,307 | 144,307 | 144,307 | 144,307 | 10,671 | 194,151 | 204,821 | 204,821 |
| mol wt. | 17.808 | 14.525 | 12.096 | 12.096 | 17.954 | 28.535 | 27.684 | 27.684 |
| temperature (C.) | 352 | 757 | 950 | 469 | 380 | 650 | 1,050 | 529 |
| pressure (kPa) | 4,110 | 3,700 | 3,420 | 3,410 | 4,310 | 3,420 | 3,420 | 3,410 |

| Zone | 1 | 2 | Total | |
|---|---|---|---|---|
| Catalyst % volume per zone | 53.4% | 46.4% | 100.0% | |
| Methane conversion per zone | 41.1% | 44.8% | 85.9% | |
| Heat load per zone | 347.7 | 315.6 | 663.3 | GJ/hr |
| % heat load per zone | 52.4% | 47.6% | 100.0% | |

The invention claimed is:

1. A process for steam or dry reforming of hydrocarbons in a reforming reactor, to form a cooled reformed gas product stream and a further-cooled combustion products stream, the process comprising steps of:
   (a) passing a feedstock, the feedstock comprising one or more hydrocarbons together with steam and/or CO2, through a first catalytic zone at an elevated temperature, to form a partly reformed process gas, wherein the first catalytic zone comprises one or more elongate conduits, each containing reforming catalyst; and
   (b) passing the partly reformed process gas through a second catalytic zone at an elevated temperature, so as to form a reformed gas stream, wherein the second catalytic zone comprises one or more elongate conduits, each containing reforming catalyst;

wherein an elongate conduit of the first catalytic zone and an elongate conduit of the second catalytic zone are longitudinally aligned and together form an elongate reforming assembly;

wherein the process further comprises combustion of a fluid fuel with a combustion-sustaining medium in an exothermic combustion region, to form a hot combustion products stream, wherein the exothermic combustion region is adjacent to and laterally surrounds each of the second catalytic zone elongate conduits, wherein the fluid fuel and the combustion-sustaining medium are separately fed to the exothermic combustion region and are then introduced to each other within said exothermic combustion region;

wherein heat for providing the elevated temperature in step (b) is directly supplied by transfer of heat from the exothermic combustion region to the second catalytic zone elongate conduits, by transfer of heat from both (i) the combustion itself and (ii) the hot combustion products stream, both convectively and by gas radiation;

whereby the hot combustion products stream is cooled by said transfer of heat to the second catalytic zone elongate conduits, to form a partly cooled combustion products stream;

wherein heat for providing the elevated temperature in step (a) is supplied to the first catalytic zone elongate conduits from: (i) the reformed gas stream and (ii) said partly cooled combustion products stream;

whereby the reformed gas stream is cooled by said transfer of heat to the first catalytic zone elongate conduits, to form a cooled reformed gas product stream; and whereby the partly cooled combustion products stream is cooled by said transfer of heat to the first catalytic zone, to form a further-cooled combustion products stream.

2. The process according to claim 1, wherein the process is carried out in a single vessel containing two or more elongate reforming assemblies.

3. The process according to claim 1, wherein the fluid fuel and the combustion-sustaining medium are introduced to each other within said exothermic combustion region via a plurality of burner nozzles, and wherein a number of burner nozzles is greater than a number of elongate conduits in said second catalytic zone.

4. The process according to claim 1, wherein in step (a) the reformed gas stream flows counter-currently and in indirect heat exchange contact with the feedstock, such that heat is transferred from the reformed gas stream to the feedstock, and simultaneously the partly cooled combustion products stream flows counter-currently and in indirect heat exchange contact with the feedstock, such that heat is transferred from the partly cooled combustion products stream to the feedstock.

5. The process according to claim 4, wherein in step (a) the partly cooled combustion products stream flows co-currently in indirect heat exchange contact with reformed gas stream, such that heat is transferred from the partly cooled combustion products stream to the reformed gas stream, and heat is transferred from the reformed gas stream to the feedstock.

6. The process according to claim 4, wherein in step (a) the reformed gas stream flows through a passage inside each of the one or more elongate conduits of the first catalytic zone, and simultaneously the partly cooled combustion products stream flows outside of each of the one or more elongate conduits of the first catalytic zone.

7. The process according to claim 1, wherein the fluid fuel and the combustion-sustaining medium are each fed to the combustion zone at a temperature sufficient to sustain auto-ignition.

8. The process according to claim 1, wherein a pressure of the combustion-sustaining medium is controlled such that a differential pressure between the second catalytic zone and the exothermic combustion region, at a location of where a conduit wall temperature is highest, is:
a) less than 500 kPa, or
b) less than 100 kPa, or
c) less than 20 kPa.

9. The process according to claim 1, wherein the catalyst used in the first catalytic zone and the catalyst used in the second catalytic zone are each independently selected from: random packing catalysts, structured catalysts, monolithic catalysts, and combinations thereof.

10. The process according to claim 9, wherein one or both of the first catalytic zone and second catalytic zone include two or more different types of catalyst.

11. An apparatus suitable for carrying out a process for steam or dry reforming of hydrocarbons in a reforming reactor, to form a cooled reformed gas product stream and a further-cooled combustion products stream, wherein the apparatus comprises:

a housing, the housing containing:
a first catalytic zone comprising one or more elongate conduits, each containing reforming catalyst, and each having an inlet and an outlet, whereby in use a feedstock comprising one or more hydrocarbons together with steam and/or $CO_2$ can enter a first catalytic zone elongate conduit via its inlet and pass through said first catalytic zone elongate conduit at an elevated temperature, to form a partly reformed process gas, which can then exit via the outlet of said elongate conduit;

a second catalytic zone comprising one or more elongate conduits, each containing reforming catalyst, and each having an inlet and an outlet, whereby in use partly reformed process gas from the first catalytic zone can enter a second catalytic zone elongate conduit via its inlet and pass through said second catalytic zone elongate conduit at an elevated temperature, so as to form a reformed gas stream, which can then exit via the outlet of said elongate conduit; and an exothermic combustion region laterally surrounding the second catalytic zone, wherein the exothermic combustion region is associated with a plurality of burner nozzles, a fuel inlet through which fluid fuel can be provided, and a combustion-sustaining medium inlet through which combustion-sustaining medium can be provided, such that in use fluid fuel from the fuel inlet and combustion-sustaining medium from the combustion-sustaining medium inlet can be introduced to each other via said plurality of burner nozzles, and combustion of the fluid fuel with the combustion-sustaining medium can occur in the exothermic combustion region to form a hot combustion products stream, so that in use there can be transfer of heat from the hot combustion products stream to the second catalytic zone via the exothermic combustion region;

a heat recovery region, being adapted to, in use, receive heat from the reformed gas product stream and from the hot combustion products stream after the hot combustion products stream has provided heat to the second catalytic zone, and to transfer heat to the first catalytic zone;
a combustion products stream outlet, through which the hot combustion products stream can exit the housing after the hot combustion products stream has lost heat in the heat recovery region; and
a reformed gas stream outlet, through which the reformed gas stream can exit the housing after the reformed gas stream has lost heat in the heat recovery region;
wherein the apparatus comprises one or more process tube assemblies, each process tube assembly comprising an inner tube and an outer tube in a concentric arrangement, with each inner tube containing a first reforming catalyst portion, with a first reforming catalyst bed, and each outer tube containing a second reforming catalyst portion, with a second reforming catalyst bed, the first reforming catalyst bed and the second reforming catalyst bed arranged in series, whereby the first reforming catalyst portion is part of the first catalytic zone and the second reforming catalyst portion is part of the second catalytic zone, and whereby an internal conduit passes through the second reforming catalyst portion for a purpose of providing partially reformed gas from an exit of the first reforming catalyst bed to an inlet of the second reforming catalyst bed.

12. The apparatus according to claim 11, in which the elongate conduits of the second catalytic zone and the burner nozzles are arranged in a regular array, orthogonal to a flow of the combustion products stream and the feedstock.

13. The apparatus according to claim 11, whereby two concentric tubes of each process tube assembly are free to move independently in a longitudinal direction relative to one other, with there being no direct or indirect connection between the two concentric tubes, other than at a single location where their positions are fixed relative to one another.

14. The apparatus according to claim 11, whereby the outer tube comprises a single elongate tube that is located partly in the exothermic combustion region and partly in the heat recovery region.

15. The apparatus according to claim 11, wherein a number of burner nozzles is greater than a number of elongate conduits in said second catalytic zone.

16. The apparatus according to claim 11, wherein one or more radiative inserts are included, external to the first catalytic zone and the second catalytic zone and located at least partly in the heat recovery region.

17. The apparatus according to claim 11, wherein the exothermic combustion region laterally surrounds and is directly adjacent to the second catalytic zone.

18. The apparatus according to claim 11, wherein the plurality of burner nozzles, fuel inlet and combustion-sustaining medium inlet are arranged relative to the second catalytic zone such that, in use, there can be direct transfer of heat from the exothermic combustion region to the second catalytic zone by transfer of heat from both (i) the combustion itself and (ii) the hot combustion products stream, both convectively and by gas radiation.

19. A process tube assembly suitable for use in a process for steam or dry reforming of hydrocarbons in a reforming reactor, to form a cooled reformed gas product stream and a further-cooled combustion products stream, the process tube assembly comprising an inner tube and an outer tube in a concentric arrangement,
wherein the inner tube contains a first reforming catalyst portion, with a first reforming catalyst bed,
wherein the outer tube contains a second reforming catalyst portion, with a second reforming catalyst bed,
whereby the first reforming catalyst bed and the second reforming catalyst bed are arranged in series, and
whereby the inner tube has an exit through which partially reformed gas can leave the inner tube, and whereby an internal conduit, through which partially reformed gas can flow, runs from the exit of the inner tube and passes through the second reforming catalyst portion.

20. The process tube assembly according to claim 19, wherein the inner tube and the outer tube of the process tube assembly are free to move independently in a longitudinal direction relative to one other, with there being no direct or indirect connection between the two tubes, other than at a single location where their positions are fixed relative to one another.

21. The process tube assembly according to claim 19, wherein the internal conduit is co-joined with a part of the inner tube that contains the first reforming catalyst bed.

22. The process tube assembly according to claim 19, wherein the process tube assembly has a single inlet and a single outlet, with both the inlet and outlet being at a same end of the assembly.

23. The process according to claim 1, wherein:
the process involves use of an elongate process tube assembly, which comprises both a first catalytic zone elongate conduit and a second catalytic zone elongate conduit, such that a single assembly provides (a) a first catalytic zone comprising an elongate conduit which has an inlet and an outlet and which contains reforming catalyst, and (b) a second catalytic zone comprising an elongate conduit which has an inlet and an outlet and which contains reforming catalyst, and wherein the first catalytic zone elongate conduit and the second catalytic zone elongate conduit are longitudinally aligned with each other in the process tube assembly, such that a central longitudinal axis of the elongate process tube assembly corresponds with the central longitudinal axis of the first catalytic zone elongate conduit and with the central longitudinal axis of the second catalytic zone elongate conduit;
and wherein said process tube assembly comprises an inner tube and an outer tube in a concentric arrangement, wherein:
the inner tube contains a first reforming catalyst portion with a first reforming catalyst bed, said first reforming catalyst portion being part of the first catalytic zone,
the outer tube contains a second reforming catalyst portion with a second reforming catalyst bed, said second reforming catalyst portion being part of the second catalytic zone,
the first reforming catalyst bed and the second reforming catalyst bed are arranged in series,
the inner tube has an exit through which partially reformed gas can leave the inner tube, and
an internal conduit, through which partially reformed gas can flow, runs from the exit of the inner tube and passes through the second reforming catalyst portion, wherein said internal conduit provides partially reformed gas from an exit of the first reforming catalyst bed to an inlet of the second reforming catalyst bed;
wherein the outer tube, the internal conduit and the second reforming catalyst portion are configured and arranged such that partially reformed gas leaves the exit of the internal conduit and then changes direction such that the partially reformed gas passes through the second reforming catalyst portion in an opposite direction to a direction of flow of the partially reformed gas through the internal conduit, and therefore a direction of flow through the first reforming catalyst portion is a same as a direction of flow through the internal conduit, and thus the process gases flow through the first and second reforming catalyst portion in opposite directions, such that the combustion gases can flow outside of the process tube assembly outer tube in a single direction.

24. The process according to claim 23, wherein additional heat transfer enhancement means are used, within and external to the elongate conduits, and wherein said heat transfer enhancement means are selected from: fins, surface treatments, and devices to increase fluid velocities and/or fluid flow tortuosity.

25. The apparatus according to claim 11, wherein:
the apparatus comprises an elongate process tube assembly, which comprises both a first catalytic zone elongate conduit and a second catalytic zone elongate conduit, such that a single assembly provides (a) a first catalytic zone comprising an elongate conduit which has an inlet and an outlet and which contains reforming catalyst, and (b) a second catalytic zone comprising an elongate conduit which has an inlet and an outlet and which contains reforming catalyst, and wherein the first catalytic zone elongate conduit and the second catalytic zone elongate conduit are longitudinally aligned with each other in the process tube assembly, such that a central longitudinal axis of the elongate process tube assembly corresponds with the central longitudinal axis of the first catalytic zone elongate conduit and with the central longitudinal axis of the second catalytic zone elongate conduit; and
wherein said process tube assembly comprises an inner tube and an outer tube in a concentric arrangement, wherein:

the inner tube contains a first reforming catalyst portion with a first reforming catalyst bed, said first reforming catalyst portion being part of the first catalytic zone, the outer tube contains a second reforming catalyst portion with a second reforming catalyst bed, said second reforming catalyst portion being part of the second catalytic zone, the first reforming catalyst bed and the second reforming catalyst bed are arranged in series, the inner tube has an exit through which partially reformed gas can leave the inner tube, an internal conduit, through which partially reformed gas can flow, runs from the exit of the inner tube and passes through the second reforming catalyst portion, such that, in use, said internal conduit provides partially reformed gas from an exit of the first reforming catalyst bed to an inlet of the second reforming catalyst bed;

and wherein the outer tube, the internal conduit and the second reforming catalyst portion are configured and arranged such that, in use, partially reformed gas leaves the exit of the internal conduit and then changes direction such that the partially reformed gas passes through the second reforming catalyst portion in an opposite direction to a direction of flow of the partially reformed gas through the internal conduit, and therefore a direction of flow through the first reforming catalyst portion is a same as the direction of flow through the internal conduit, and thus the process gases flow through the first reforming catalyst portion and the second reforming catalyst portion in opposite directions, such that combustion gases can flow outside of the process tube assembly outer tube in a single direction.

* * * * *

UNITED STATES PATENT AND TRADEMARK OFFICE
CERTIFICATE OF CORRECTION

PATENT NO. : 12,017,914 B2
APPLICATION NO. : 17/268388
DATED : June 25, 2024
INVENTOR(S) : Geoffrey Gerald Weedon et al.

Page 1 of 2

It is certified that error appears in the above-identified patent and that said Letters Patent is hereby corrected as shown below:

In the Drawings

Sheet 3 of 8, Figure 2B, should be replaced with the attached replacement sheet.

Signed and Sealed this
Fifteenth Day of April, 2025

Coke Morgan Stewart
*Acting Director of the United States Patent and Trademark Office*